(12) United States Patent
Maleki et al.

(10) Patent No.: US 7,061,335 B2
(45) Date of Patent: Jun. 13, 2006

(54) PROCESSING OF SIGNALS WITH REGENERATIVE OPTO-ELECTRONIC CIRCUITS

(75) Inventors: Lutfollah Maleki, Pasadena, CA (US); Danny Eliyahu, Pasadena, CA (US)

(73) Assignee: OEwaves, Inc., Pasadena, CA (US)

( * ) Notice: Subject to any disclaimer, the term of this patent is extended or adjusted under 35 U.S.C. 154(b) by 33 days.

(21) Appl. No.: 11/107,316

(22) Filed: Apr. 15, 2005

(65) Prior Publication Data

US 2005/0248823 A1    Nov. 10, 2005

Related U.S. Application Data

(60) Provisional application No. 60/562,865, filed on Apr. 16, 2004, provisional application No. 60/562,654, filed on Apr. 15, 2004.

(51) Int. Cl.
 *H03B 5/00*  (2006.01)
(52) U.S. Cl. .......................................... 331/66; 331/172
(58) Field of Classification Search ................ 331/3, 331/65–66, 94.1, 96, 172, 175
See application file for complete search history.

(56) References Cited

U.S. PATENT DOCUMENTS

| | | | |
|---|---|---|---|
| 4,849,716 A * | 7/1989 | Golio et al. ................ 331/66 |
| 5,204,640 A | 4/1993 | Logan | |
| 5,210,763 A | 5/1993 | Lewis et al. | |
| 5,220,292 A | 6/1993 | Bianchini et al. | |
| 5,723,856 A | 3/1998 | Yao et al. | |
| 5,777,778 A | 7/1998 | Yao | |
| 5,917,179 A | 6/1999 | Yao | |
| 5,929,430 A | 7/1999 | Yao et al. | |
| 6,178,036 B1 | 1/2001 | Yao | |
| 6,389,197 B1 | 5/2002 | Iltchenko et al. | |
| 6,417,957 B1 | 7/2002 | Yao | |
| 6,473,218 B1 | 10/2002 | Maleki et al. | |
| 6,476,959 B1 | 11/2002 | Yao | |
| 6,487,233 B1 | 11/2002 | Maleki et al. | |
| 6,488,861 B1 | 12/2002 | Yao et al. | |
| 6,490,039 B1 | 12/2002 | Maleki et al. | |
| 6,535,328 B1 | 3/2003 | Yao | |
| 6,567,436 B1 | 5/2003 | Yao et al. | |
| 6,580,532 B1 | 6/2003 | Yao et al. | |
| 6,594,061 B1 | 7/2003 | Huang et al. | |
| 6,762,869 B1 | 7/2004 | Maleki et al. | |
| 2002/0018611 A1 | 2/2002 | Maleki et al. | |
| 2003/0012504 A1 | 1/2003 | Iltchenko | |

FOREIGN PATENT DOCUMENTS

WO    WO0196936    12/2001

OTHER PUBLICATIONS

Logan, et al.; Stabilization of Oscillator Phase Using a Fiber-Optic Delay-Line; 1991; 45th Annual Symposium on Frequency Control; pps 508-512.

(Continued)

*Primary Examiner*—David Mis
(74) *Attorney, Agent, or Firm*—Fish & Richardson P.C.

(57) ABSTRACT

Opto-electronic regenerative circuits and devices for processing RF or microwave signals based on opto-electronic oscillator designs.

20 Claims, 19 Drawing Sheets

OTHER PUBLICATIONS

L.E. Myers, et al.; Quasi-phase-matched optical parametric oscillators in bulk periodically poled $LiNbO_3$; Nov. 1995; J.Opt. Soc. Am. B/vol. 12, No. 11; pps. 2102-2116.

X. Steve Yao, et al.; Converting Light into Spectrally Pure Microwave Oscillation; Apr. 1996; Optics Letters, vol. 21, No. 7; pps. 483-485.

H. Ito, et al.; InP/InGaAs uni-travelling-carrier photodiode with 310 GHz receiver; Oct. 12, 2000; Electronics Letters, vol. 36, No. 21; pps. 1809-1810.

V. Ilchenko, et al.; Sub-Micro Watt Photonic Microwave Receiver; Nov. 2002; IEEE Photonics Technology Letters, vol. 14, No. 11; pps. 1602-1604.

\* cited by examiner

1001
RF or Microwave
Input

Optical Spectrum of Modulated Optical Beam 732

Field localization

PROCESSING OF SIGNALS WITH REGENERATIVE OPTO-ELECTRONIC CIRCUITS

This application claims the benefits of U.S. Provisional Patent Application Nos. 60/562,654 entitled "Opto-electronic regenerative filter" and filed Apr. 15, 2004, and 60/562,865 entitled "Opto-electronic regenerative frequency divider" and filed Apr. 16, 2004. The entire disclosures of the above two patent applications are incorporated herein by reference as part of the specification of this application.

BACKGROUND

This application relates to opto-electronic devices and techniques of using such devices to process signals.

Signals at frequencies below the optical spectral range, such as signals in the radio frequency (RF) and microwave spectral ranges, may be generated by using opto-electronic oscillators (OEOs) which include at least one closed loop with an optical loop section and an electrical loop section to generate a desired oscillation signal. In the optical section, an optical carrier is modulated to carry the oscillation signal below the optical spectral range. Some examples of OEOs are described in, e.g., U.S. Pat. No. 5,723,856 to Yao and Maleki, U.S. Pat. No. 5,777,778 to Yao, U.S. Pat. No. 5,929,430 to Yao and Maleki, and U.S. Pat. No. 6,567,436 to Yao, Maleki, and Ilchenko. In these examples, an OEO includes an electrically controllable optical modulator and at least one active opto-electronic feedback loop that comprises an optical part and an electrical part interconnected by a photodetector. The opto-electronic feedback loop receives the modulated optical output from the modulator and converts it into an electrical signal to control the modulator. The loop produces a desired delay and feeds the electrical signal in phase to the modulator to generate and sustain both optical modulation and electrical oscillation when the total loop gain of the active opto-electronic loop and any other additional feedback loops exceeds the total loss. Such OEOs use optical modulation to produce oscillations in frequency spectral ranges that are outside the optical spectrum, such as in the RF and microwave frequencies. The generated oscillating signals can be tunable in frequencies and can have narrow spectral linewidths and low phase noise in comparison with the signals produced by other RF and microwaves oscillators. Therefore, OEOs are hybrid devices that combine optical and electronic components and allow for versatile applications.

Signals in RF or microwave spectral ranges can be reconditioned, and processed with electronic circuits for various applications. For example, an electronic regenerative filter may be used to receive a microwave or RF signal and to regenerate a new signal at the same signal frequency with a reduced bandwidth and higher quality factor than the original signal. As another example, an electronic regenerative divider may be used to regenerate a signal at a new frequency of f/N where N is an integer representing the dividing factor of the divider. These and other electronic devices for processing RF or microwave signals have various limitations in part due to the electronic nature of such devices.

SUMMARY

This application describes, among others, techniques and devices for using opto-electronic regenerative devices to process signals. Implementations of the techniques and devices use closed-loop opto-electronic circuits to receive an input signal into the closed loop and use a signal oscillation at a selected frequency to regenerate a signal from the input signal at the selected frequency. The selected frequency may be the same as the frequency of the input signal and may be different from the frequency of the input signal. The optical portion of the opto-electronic loop can be designed to produce a high quality factor for the closed loop that is much higher than the quality factor achievable in electronic devices and thus the regenerated signal at the selected frequency has a narrower linewidth and lower phase noise in comparison with a similarly regenerated signal by electronic devices.

Examples of the closed-loop opto-electronic circuits described here may use opto-electronic oscillators (OEOs). In some implementations, an opto-electronic oscillator may be configured and operated at an initial state below an oscillation threshold of the oscillator when no input signal is received. Under this initial state, the total loss in the loop is greater than the total gain in the loop and thus no oscillation is generated. When an input signal to be processed is injected to the loop of the oscillator in this initial state, either electronically in the electronic section or optically as a r signal carried by a modulated optical carrier in the optical section, the loop is operated above the oscillation threshold of the oscillator and thus generates and sustains an oscillation signal in the loop.

The loop can be controlled to select the oscillation signal frequency which may be equal to a frequency of the input signal or at a different frequency from the frequency of the input signal. An RF or microwave frequency bandpass filter may be inserted in the loop to select the oscillation signal frequency. When the oscillation signal frequency is different from the frequency of the input signal, the filter may be set at a frequency of a selected nonlinear signal component generated by a nonlinear response of the loop, e.g., in the optical modulator, an electronic amplifier, or in another component with a nonlinear response in the loop to force the loop to oscillate at this frequency of the selected nonlinear signal component. The selected nonlinear signal component may be a harmonic frequency, Nfin, of the frequency (fin) in the injected input signal where N is an integer greater than 1. In this configuration, the oscillator operates as a regenerative frequency multiplier. The selected nonlinear signal component may also be at a frequency of fin/N. In this configuration, the oscillator operates as a regenerative frequency divider. When the loop is controlled to select the oscillation signal frequency equal to a frequency of the input signal, the oscillator operates a regenerative filter.

The opto-electronic oscillator used in the above implementations is regenerative in the sense that the loop is an active loop and mixes the energy of the injected input signal with at least the energy in the loop from the optical carrier to produce an in-phase feedback to control the optical modulation and thereby generate the oscillation signal as a new signal. In some implementations, additional electrical energy may be supplied to the electrical section of the loop via, e.g., an electronic amplifier, to ensure the gain in the loop to exceed the total loss. Therefore, the loop is not passive and does not simply passively transform the injected input signal into the oscillation signal. Different from electronic regenerative circuits with all electronic components, such opto-electronic oscillator uses the optical section of the loop to produce a high quality factor that is difficult to achieve with electronic components and to produce a long optical delay to suppress the phase noise to a level that is also difficult to achieve with electronic circuits. The opto-electronic nature of the oscillator further provides versatile interfacing with an external device or system through either one or both of electronic and optical forms.

In one implementation, a method is described as follows. An opto-electronic oscillator device is provided to include a closed opto-electronic loop which comprises an electronic section and an optical section and forms a positive feedback loop. The closed opto-electronic loop includes an input port to receive an input signal at an input signal frequency and an output port to output an output signal at an output signal frequency. The closed opto-electronic loop is set at an initial state with a loop gain below an oscillation threshold when the input port does not receives the input signal. The input signal is injected into the input port to operate the closed opto-electronic loop above the oscillation threshold to produce and sustain an oscillation signal in the closed opto-electronic loop. A portion of the oscillation signal is coupled out of the closed opto-electronic loop to produce the output signal at the output port.

In another implementation, a device is described to include a closed opto-electronic loop, an input coupler and an output coupler. The closed opto-electronic loop includes an electronic section to carry an electronic signal, an optical section comprising an optical modulator to modulate an optical carrier to produce a modulated optical signal carrying the electronic signal, and a photodetector interconnecting the electronic section and the optical section to convert the optical signal into the electronic signal. The electronic section is coupled to feed the electronic signal to control the optical modulator. The input coupler is coupled to the closed opto-electronic loop to receive and inject an input signal at an input signal frequency supported by the electronic portion. The output coupler coupled to the closed opto-electronic loop to couple an output signal out of the closed opto-electronic loop at an output signal frequency supported by the electronic portion and different from the input signal frequency. The closed opto-electronic loop forms a positive feedback loop and has a nonlinear response to produce at least one nonlinear signal component at the output signal frequency.

This application also describes an implementation of a device which includes a closed opto-electronic loop comprising an electronic section to carry an electronic signal, an optical section comprising an optical modulator to modulate an optical carrier to produce a modulated optical signal carrying the electronic signal, and a photodetector interconnecting the electronic section and the optical section to convert the optical signal into the electronic signal. The electronic section is coupled to feed the electronic signal to control the optical modulator. The device includes an input coupler coupled to the closed opto-electronic loop to receive and inject an input signal at an input signal frequency supported by the electronic portion and an input coupler coupled to the closed opto-electronic loop to couple an output signal out of the closed opto-electronic loop at an output signal frequency supported by the electronic portion and different from the input signal frequency. In this implementation, the closed opto-electronic loop forms a positive feedback loop and comprises a bandpass filter to transmit at the output signal frequency and suppress signals at the input signal frequency and frequencies different from the output signal frequency.

These and other implementations are described in detail in the attached drawings, the detailed description, and the claims.

DETAILED DESCRIPTION

Figure 1:
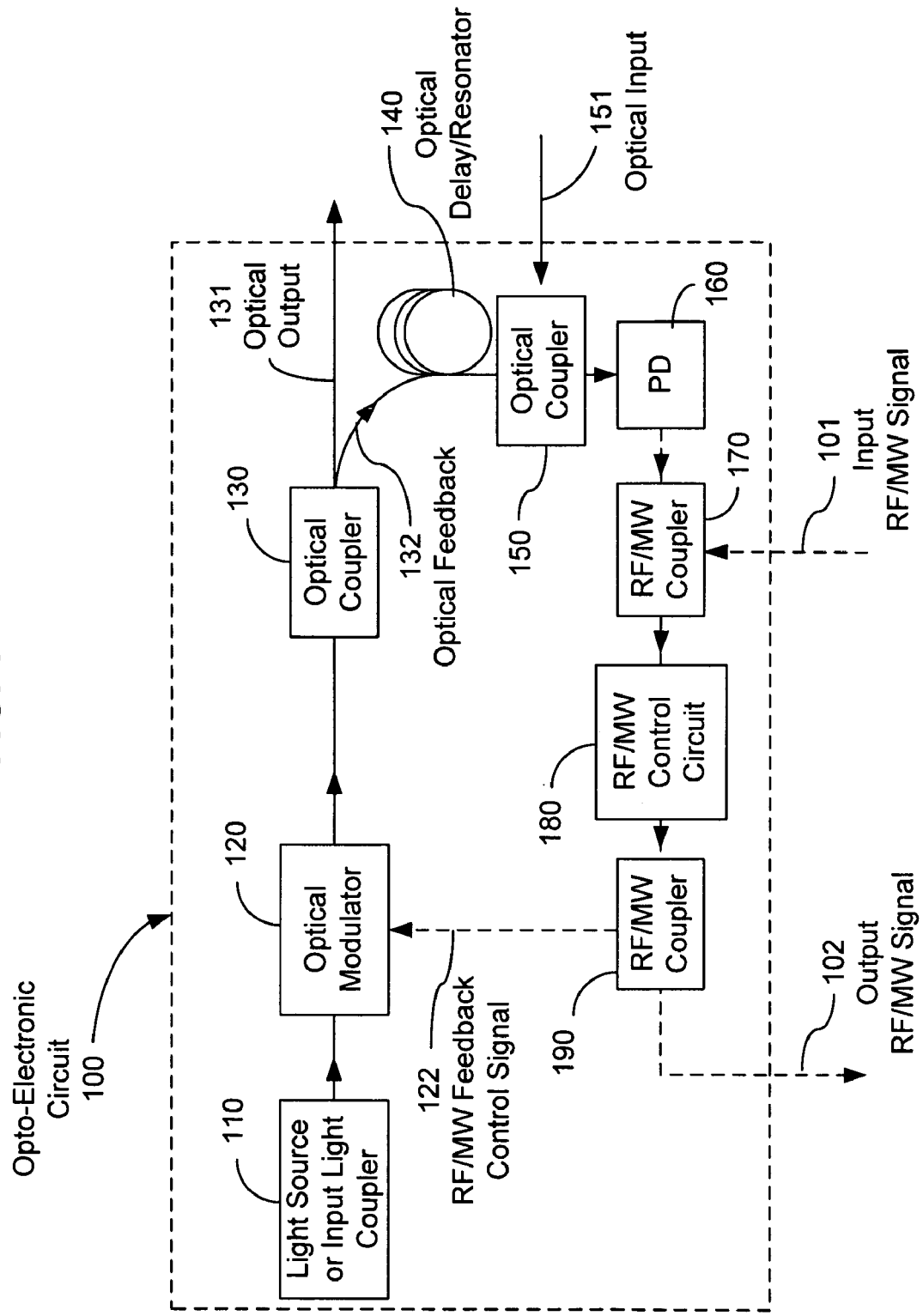
FIG. 1 shows one example of a regenerative opto-electronic circuit or device.

FIG. 1 shows one example of a regenerative opto-electronic circuit 100 for implementing the regenerative signal processing described in this application. The circuit 100 include a light source to produce an optical carrier or an input light coupler that receives the optical carrier from an external light source. An optical modulator 120 is optically coupled to receive the optical carrier and modulates the optical carrier in response to a control signal 122 to produce a modulated optical carrier that carries the control signal 122. The optical modulator 120 may an amplitude modulator or a phase modulator. The modulated optical carrier or at least a portion of the modulated optical carrier is then directed into an optical loop section which includes an optical delay element or an optical storage element 140. The optical delay element may be implemented by a fiber loop with a length to produce the desired delay time. The optical storage element may be implemented by using an optical resonator in various configurations. One example of such a resonator is a whispering gallery mode (WGM) resonator. A photodetector (PD) 160 is used to receive the optical output from the optical loop section and converts the optical output into an electronic signal. The photodetector 160 mixes the optical carrier and a modulation sideband carried by the carrier to produce a beat frequency between the optical carrier and modulation sideband which is below the optical spectral range in the RF or microwave range. A signal coupler 170 coupled downstream of the photodetector 160 is used to inject an input signal 101 into the electrical portion of the loop and combine the injected signal 101 and the output of the photodetector 160. A control circuit 180 is used to receive and process the combined signal from the coupler 170 to produce the control signal 122. A second signal coupler 190 is used to split a portion of the control signal 122 as the output signal 102.

Hence, the opto-electronic circuit 100 may be viewed as an RF or microwave processing circuit which receives the electrical input signal 101 and processes the input signal 101 to produce the electrical output signal 102. In this context, the optical operation in the optical part of the circuit is hidden from the electrical interface and the circuit is simply a two-port RF or microwave circuit.

The circuit 100, however, can be operated in other configurations, such as optical input and electrical output, electrical input and optical output, optical input and optical output. In configurations where the input RF or microwave signal 101 is to be injected optically, an optical coupler 150 may be inserted in the optical section of the opto-electronic loop to receive an input optical signal that is modulated to carry the same input RF or microwave signal that is injected via the electrical coupler 170. This feature is illustrated in FIG. 1. In configurations where an optical output of the RF or microwave signal 102, an optical coupler 130 may be placed in the optical portion of the opto-electronic loop to produce an optical output 131 which carries the output RF or microwave signal 102. This is also illustrated in FIG. 1. Hence, the opto-electronic design of the circuit 100 provides versatile configurations for the input and output that beyond the reach of electronic RF or microwave circuits.

The specific operating modes of the circuit 100 in FIG. 1 may be controlled by the control circuit 180 in the electronic portion of the opto-electronic loop. A phase shifting element may be used in the loop to control and adjust the time delay or the length of the loop so that the selected signal frequency of the output signal 101 is in resonance with the loop. The phase shift element may be an optical device in the optical section of the loop or an electronic device in the electronic section of the loop.

As an example, the control circuit 180 may be designed so that the circuit 100 behaves like a regenerative RF or microwave filter. The control circuit 180 may include a narrow bandpass filter to suppress unwanted spectral components and noise. Different from an all-electronic regenerative filter which has an electronic filter and an electronic amplifier in a feedback loop, the circuit 100 uses optical components for the regeneration of the output at the same frequency. Some implementations of such opto-electronic design can be designed to overcome certain technical limitations the all-electronic regenerative filters such as the sensitivity to phase changes resulting from environmental changes, inability to filter signals in a wide range of frequency, spanning beyond an octave, and others. This opto-electronic regenerative filter may be tunable by tuning the passband of the bandpass filter or the loop length of the loop to select a desired spectral component in the input signal 101 for regeneration.

As another example, the control circuit 180 may be designed to so that the circuit 100 behaves like a regenerative RF or microwave frequency divider to produce an RF or microwave signal 101 at a frequency of fin/N in response to the input RF or microwave signal at a frequency fin, where N is an integer greater than 2. In this design, the nonlinearity of certain components in the opto-electronic loop is used to initiate the signal at the frequency of fin/N and a bandpass filter is included in the control circuit 180 to force the oscillation in the opto-electronic loop to be at the frequency of fin/N and suppress the signal at the frequency of fin. Alternatively, the nonlinearity of certain components in the opto-electronic loop may also be used to initiate a signal at a harmonic frequency of Nfin and a bandpass filter is included in the control circuit 180 to force the oscillation in the opto-electronic loop to be at the frequency of Nfin and suppress the signal at the frequency of fin. This design of the circuit 100 effectuates a regenerative RF or microwave frequency multiplier.

In the above and other configurations for regenerative signal processing, the circuit 100 may be initially set and operated in an initial state below an oscillation threshold of the closed loop when no input signal is received. Under this initial state, the total loss in the loop is greater than the total gain in the loop and thus no oscillation is generated. When an input RF or microwave signal 101 to be processed is injected to the loop in this initial state, the loop is operated above the oscillation threshold and thus generates and sustains an oscillation signal in the loop. In some implementations, the injection of the input signal 101 may be sufficient to raise the gain beyond the loop loss. In some other implementations, the mere injection of the input signal 101 may be not sufficient for oscillation and thus an amplifier in the loop, either an optical amplifier or an electronic amplifier, may be used to boost the loop gain to cause the oscillation.

Figure 2:
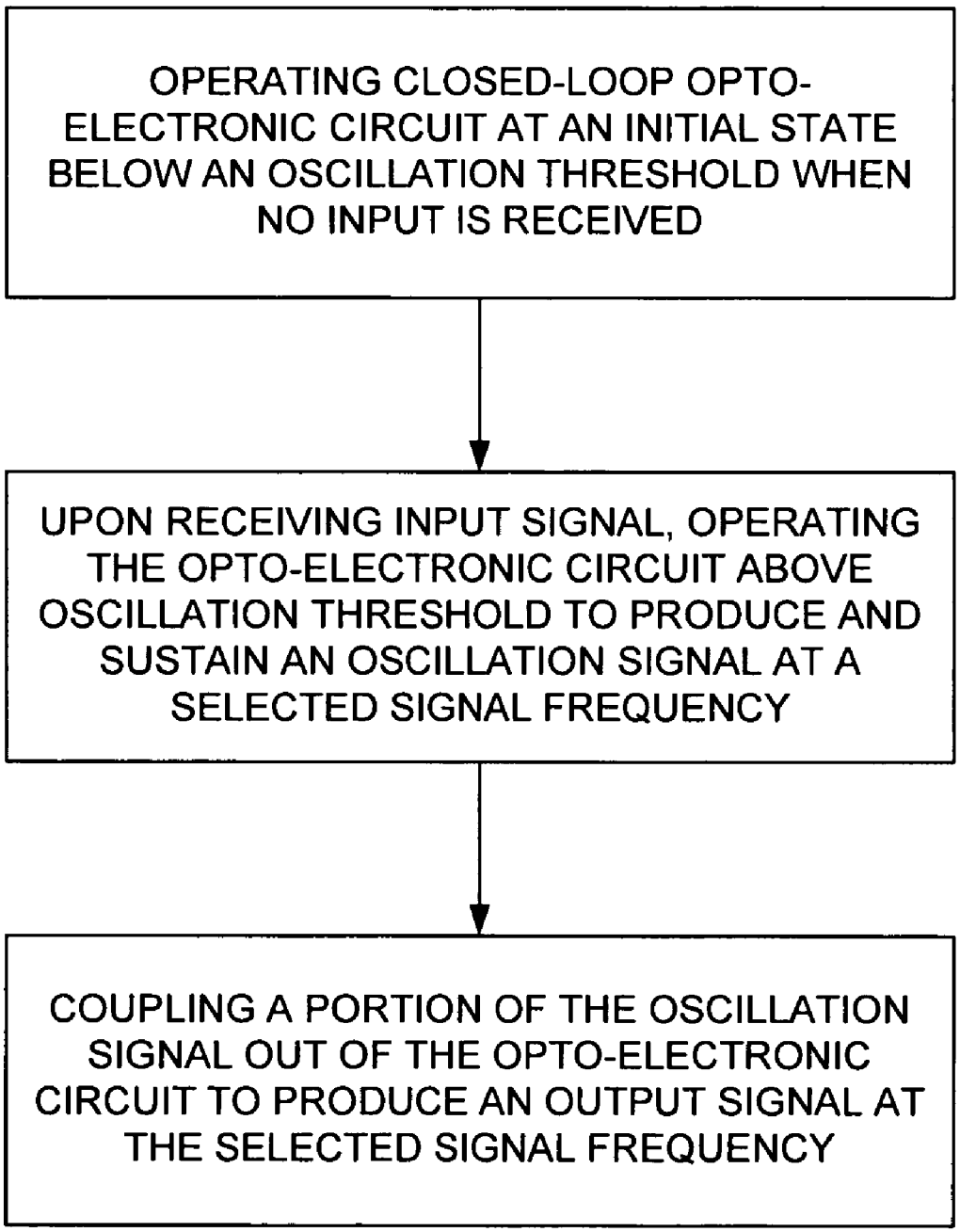
FIG. 2 shows operation of the device in FIG. 1.

FIG. 2 shows the operation of the circuit 100.

Figure 3:
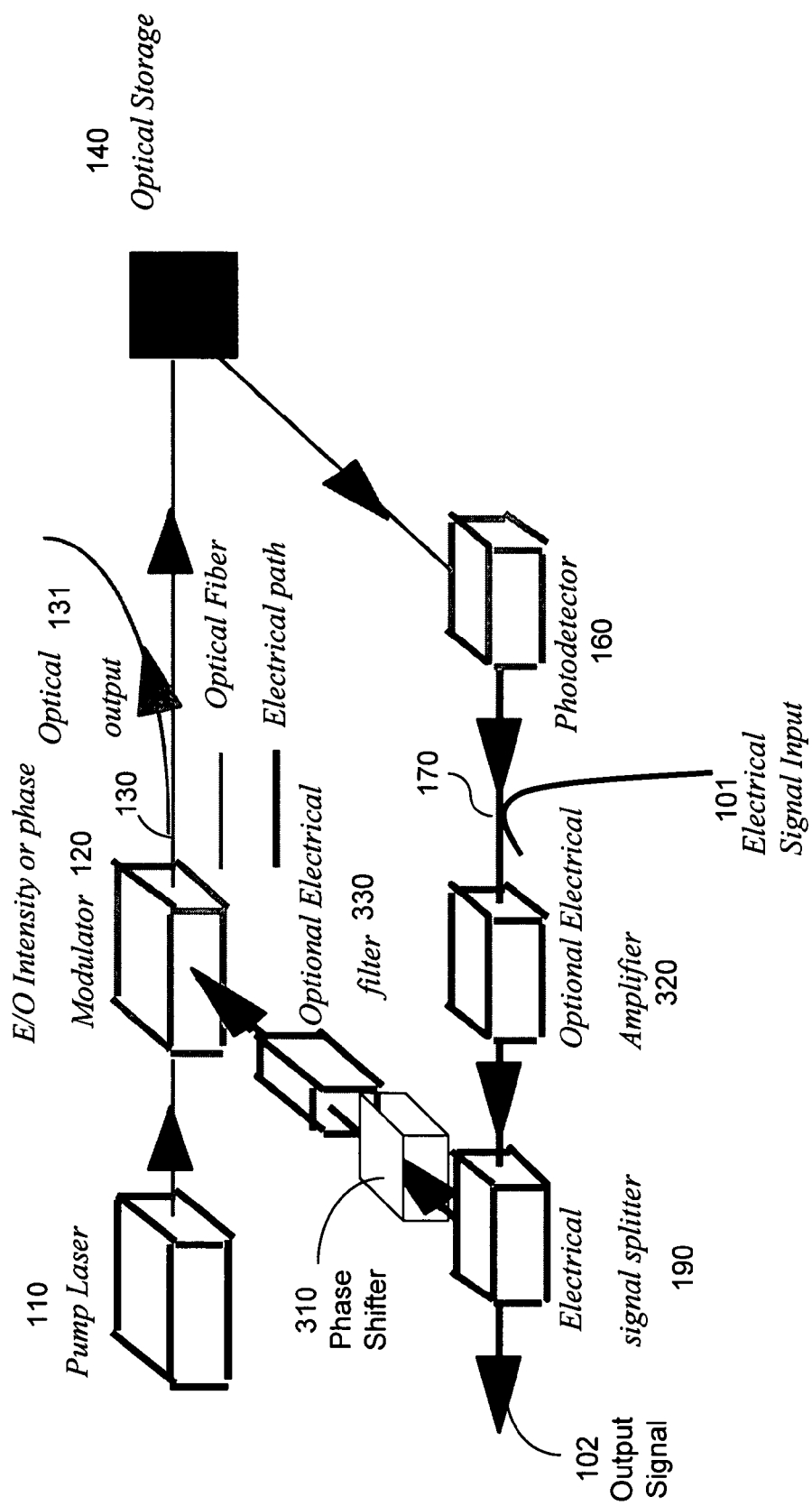
FIG. 3 shows an exemplary implementation of the device in FIG. 1 as a regenerative opto-electronic filter.

FIG. 3 shows one exemplary implementation of an opto-electronic regenerative filter based on the circuit design in FIG. 1. An RF or microwave coupler 170 is coupled in the electronic portion of the opto-electronic loop to receive the RF or microwave input signal 101. In this particular example, both electrical output port provided by the signal splitter 190 and optical output port provided by the optical coupler 130 are available to output the regenerative filtered output RF or microwave signal 102 where the optical output signal 131 carries the signal 102 in a form of a spectral sideband away from the optical carrier frequency by the amount of the frequency of the signal 102. The electrical portion of the opto-electronic feedback loop includes an optional electrical amplifier 320 to boost the loop gain if the mere injection of the input signal 101 is not sufficient to increase the loop gain greater than the oscillation threshold. An electrical bandpass filter 330 may also be coupled in the electrical portion, e.g., between signal splitter 190 and the optical modulator 120, to suppress spectral components in the feedback control signal at frequencies outside its transmission band. An RF or microwave phase shifter 310 is included in the electronic portion of the loop to make sure the feedback to the optical modulator 120 is in phase and the selected signal frequency for oscillation is in a resonance condition of the opto-electronic loop. The phase shifter may be an electronic device or a mechanical device. Either one or both of the phase shifter 310 and the filter 330 may be tuned to tune or select the signal frequency of the output RF or microwave signal 102. The output of the photodetector 160 is passed through the electronic phase shifter 310 and introduced as input to the modulator 120. This configuration, by itself without the injection signal 101, does not produce an output. Once the input 101 is introduced, the regeneration process begins above a certain power threshold, and the opto-electronic circuit functions as a high Q bandpass element to produce a cleaner output 102 then the input signal 101.

The optical storage element 140 in the optical portion of the loop may be either an optical delay element or an optical resonator. If the optical energy storage element 140 is an optical resonator or cavity, such as an etalon or a whispering gallery mode resonator, then the input signal frequency must coincide with the free spectral range of the optical resonator 140 in addition to meet the phase matching or resonance condition of the loop. This imposes restriction on the frequency of the input signal 101. If the energy storage element 140 is an optical time delay element such as a length of fiber, then any frequency supportable by the bandwidth of the modulator 120 and the photodetector 160 may be used as the input signal 101 as long as the resonance condition of the opto-electronic loop is satisfied. The phase shifter 310 may be adjusted to meet this resonance condition. The Q of the regenerative filter in FIG. 3 may be further enhanced by the addition of the bandpass filter 330 in the electrical loop. If the electrical filter 330 is tunable, again the regenerative opto-electronic filter will support signals at any frequency within the bandwidth of the tunable filter 330. The opto-electronic architecture of this regenerative filter allows the input signal 101 to be introduced in the electrical segment or the optical segment, and the output 102 can be taken out as electrical or optical output.

Figure 4:
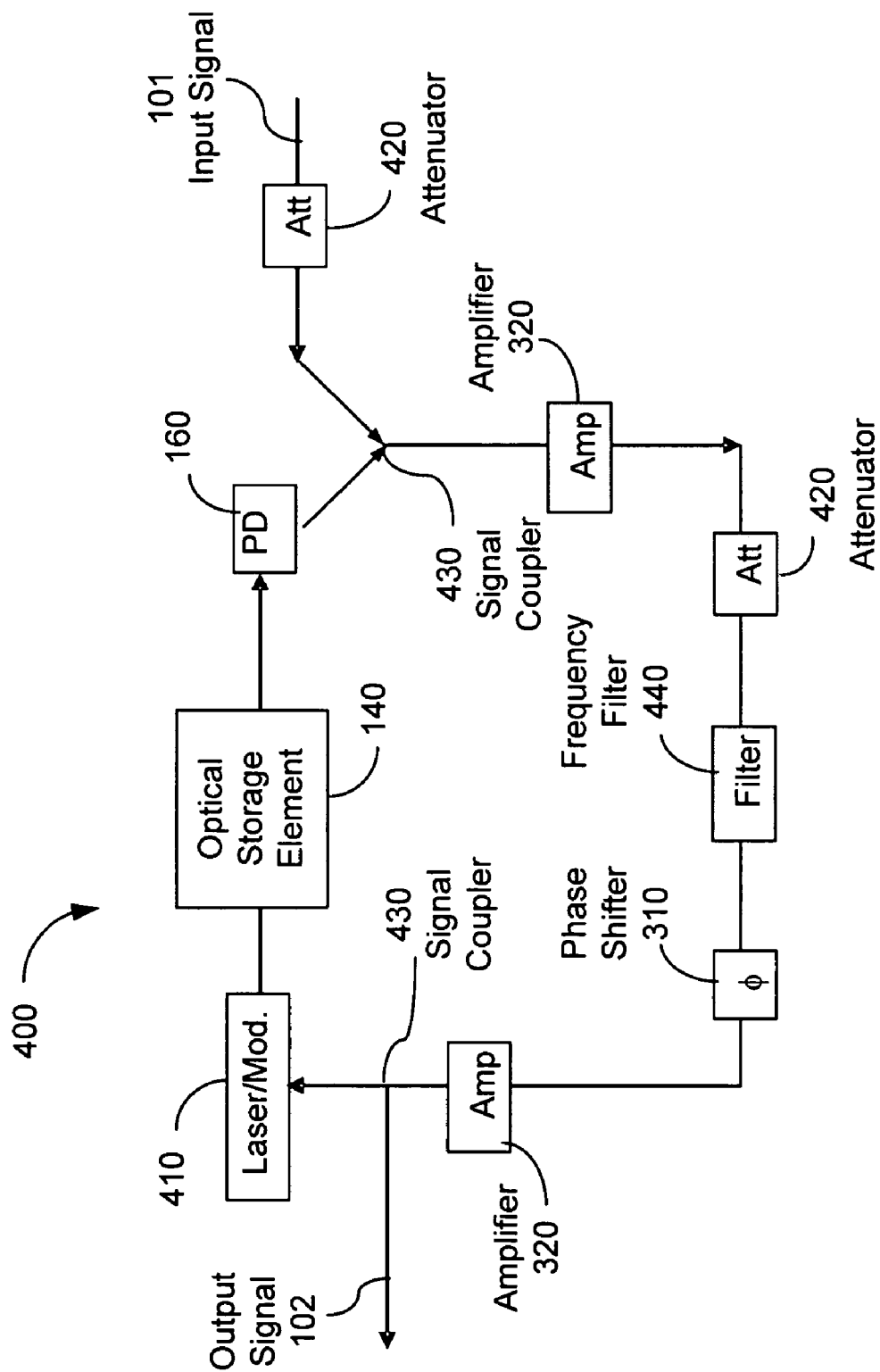
FIG. 4 shows an exemplary implementation of the device in FIG. 1 as a regenerative opto-electronic frequency divider or multiplier.

FIG. 4 shows one exemplary implementation 400 of an opto-electronic regenerative frequency divider based on the circuit design in FIG. 1. This device 400 may be configured to generate RF and microwave frequency division signals at any integer division ratio and any input frequency up to the practical bandwidth of optical components used in the opto-electronic loop. A module 410, which includes an optical modulator and may also include a laser to produce the optical carrier to be modulated by the modulator, is provided to respond a control signal to produce a modulated optical signal. An opto-electronic loop which includes the optical modulator in the module 410 is provided to produce the control signal to the optical modulator. In this example, the loop includes the optical storage element 140, the photodetector 160, a signal coupler 430 for injecting the input signal 101 at an input signal frequency (fin) into the loop, one or more amplifiers 320, an attenuator 420, a frequency bandpass filter 440, the phase shifter 310, and a signal coupler for outputting the frequency division signal 102. The filter 440 is designed to have a transmission band centered at the division frequency of fin/N where N is the division ratio and is an integer greater than 1. At least one nonlinear circuit element is included in the loop to generate a nonlinear spectral component at a frequency different from the input frequency fin of the input signal 101. The optical modulator or an amplifier 320 may be the nonlinear element to produce such nonlinear spectral component. Such a nonlinear circuit element may produce multiple nonlinear components at different frequencies. The filter 440 is to select a desired division frequency as the oscillation frequency in the loop.

The use of the opto-electronic loop in the device 400 can significantly suppress the phase noise of the generated signal 102 and provide versatile interface with other devices for both signal input and output. Electronic dividers using direct digital synthesis are known to have a high noise floor and can be limited in their operating frequency range. Various electronic regenerative dividers can be designed to produce a lower noise floor than non-regenerative electronic dividers. The signal to noise ratio in the output signal of many such electronic regenerative dividers is difficult to be beyond the ratio of $N^2$ where N is the division ratio. In addition, many electronic regenerative dividers tend to be unstable and thus their application may be limited in research laboratories. Implementations of the opto-electronic loop in FIG. 4 may be specifically designed to overcome these and other shortcoming in electronic regenerative dividers. The optical storage element 140 can be configured to have a high Q factor that is beyond the reach of many electronic circuits to more effectively suppress phase noise than electronic circuits. The output of the photodetector 160 is mixed with the injected input signal 101 via the signal coupler 430 is passed through an electronic or a mechanical phase shifter 310, the attenuator 420, the RF or microwave filter 440 (when optical fiber true time delay storage element is used) centered close to the output frequency of the signal 102, and amplifiers 320 supporting the input and output frequencies. The resultant signal is then introduced as input to the modulator. This configuration is set at an initial state so that it by itself without the injected input signal 101 does not produce an output. Once the input 101 is introduced to the frequency divider, the regeneration process begins above a certain power threshold, and the nonlinearities in the loop elements produce various signals at different frequencies that include frequencies having integer division ratios of the input signal. The microwave filter 440 isolates the desired output frequency (which is the integer division of the input frequency) and narrow band amplification takes place due to the regeneration around the loop. This process produces a low noise in the output signal 102. If the electrical filter 440 is tunable, the regenerative opto-electronic divider can support signals at any input frequency within the bandwidth of the tunable filter 440. If the optical energy storage element 140 is an optical cavity, such as an etalon or a whispering gallery mode resonator, then the free spectral range of the optical filter frequency must coincide with the desired output frequency so that the optical resonator itself becomes a built-in filter, and an electrical filter 440 may be eliminated. The phase shifter 310 can be adjusted to ensure the proper phase matching conditions. One or more signal attenuators 420 may be used to optimize the device performance. If there is not enough power in the input signal 101 to attain regeneration threshold, gain may be introduced in the electrical segment of the frequency divider by amplifiers 320. The opto-electronic regenerative filter 400 can be useful in frequency dividing any signal and producing a cleaner output than the input by a ratio of square of N or 20(log N) in dB, where N is the frequency division ratio. Better noise improvement will be obtained if a high Q optical element, such as long fiber, is used in the regenerative divider by adding the effect of regenerative filtering.

Notably, the nonlinearities in the opto-electronic loop in FIG. 4 may produce a range of nonlinear signal components at frequencies that are different from the input frequency fin of the injected input signal 101. Hence, the filter 440 may be a filter with a transmission band centered at any of the nonlinear components. As an example, in addition to frequencies at fin/N, a harmonic frequency at Nfin may be selected by the filter 440 to oscillate in the opto-electronic loop and to output as the signal 102. This configuration is essentially an opto-electronic regenerative frequency multiplier.

Figure 4A:
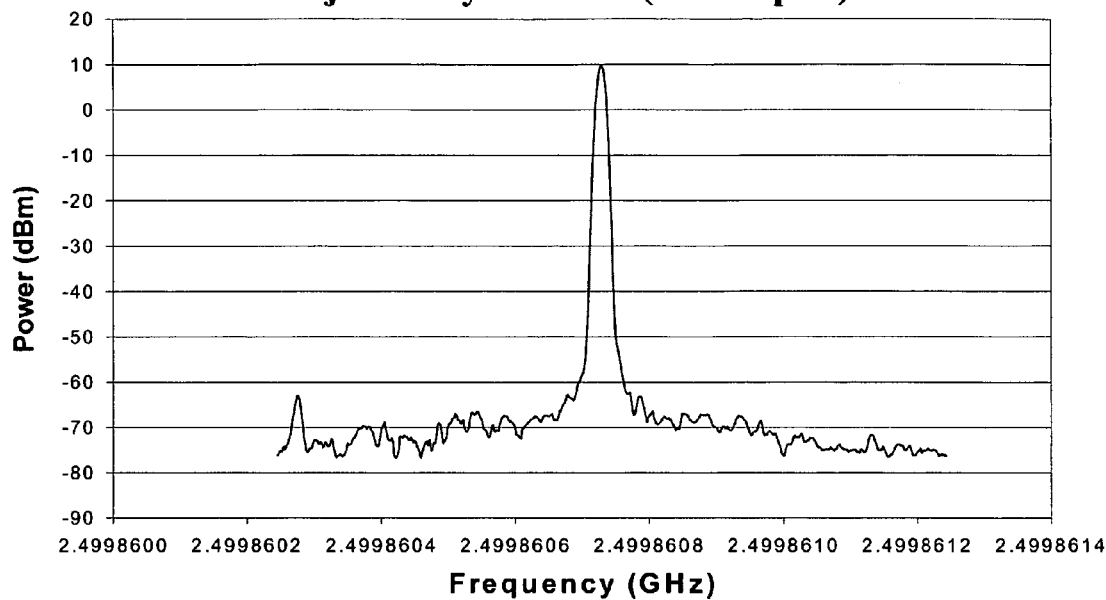
FIGS. 4A and 4B show measured spectra of the output signals of an opto-electronic frequency divider based on the design in FIG. 4.
Figure 4B:
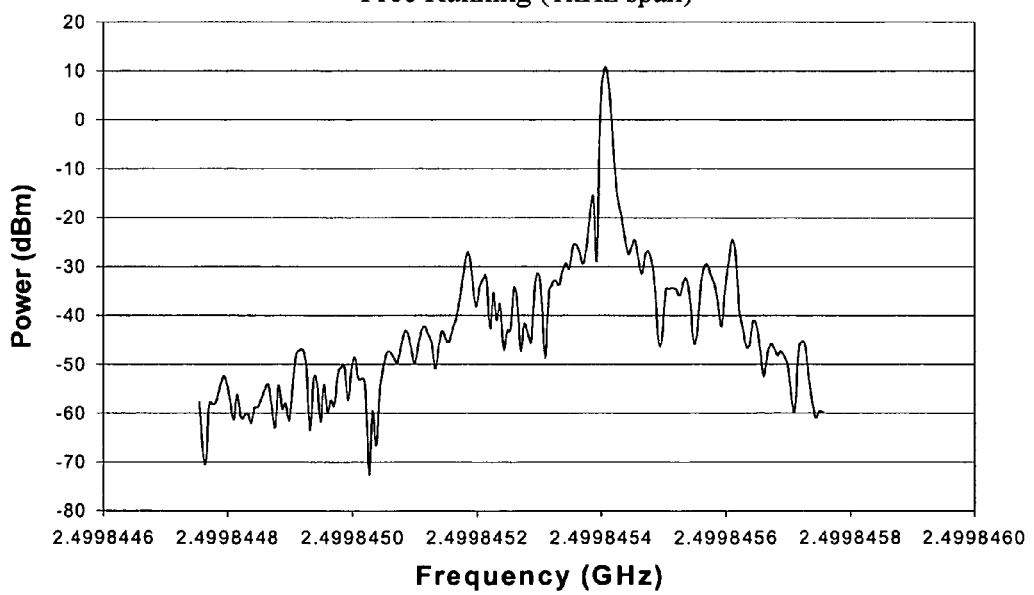

FIG. 4A shows the measured spectrum of the output signal 102 in a regenerative frequency divider based on the design in FIG. 4. A distributed feedback (DFB) laser was used to produce the optical carrier and a Lithium Niobate optical modulator was used to modulate the optical carrier. A fiber of 130 meters was used as the optical element 140 and a signal at 10 GHz was used as the input signal 101. A bandpass filter centered at 2.5 GHz was used as the filter 440 to produce a division factor N of 4 in the output signal 102. A tunable attenuator was used between the source of the injected input signal 101 at 10 GHz and the input coupler 430. As a comparison, FIG. 4B further shows the measured spectrum of the output signal in the same opto-electronic device that was operated to oscillate at 2.5 GHz as an OEO without the injected input signal 101 at 10 GHz. The measured data shows that the regenerative operation of the same device provide improved noise performance.

In the above examples, the underlying configurations for the opto-electronic devices are opto-electronic oscillators (OEO) with an optical modulator and a single opto-electronic feedback loop. OEOs can be designed with different configurations and various OEOs in other configurations may also be used to implement the above regenerative opto-electronic circuits as such the regenerative filters, regenerative frequency dividers, and regenerative frequency multipliers.

Figure 5A:
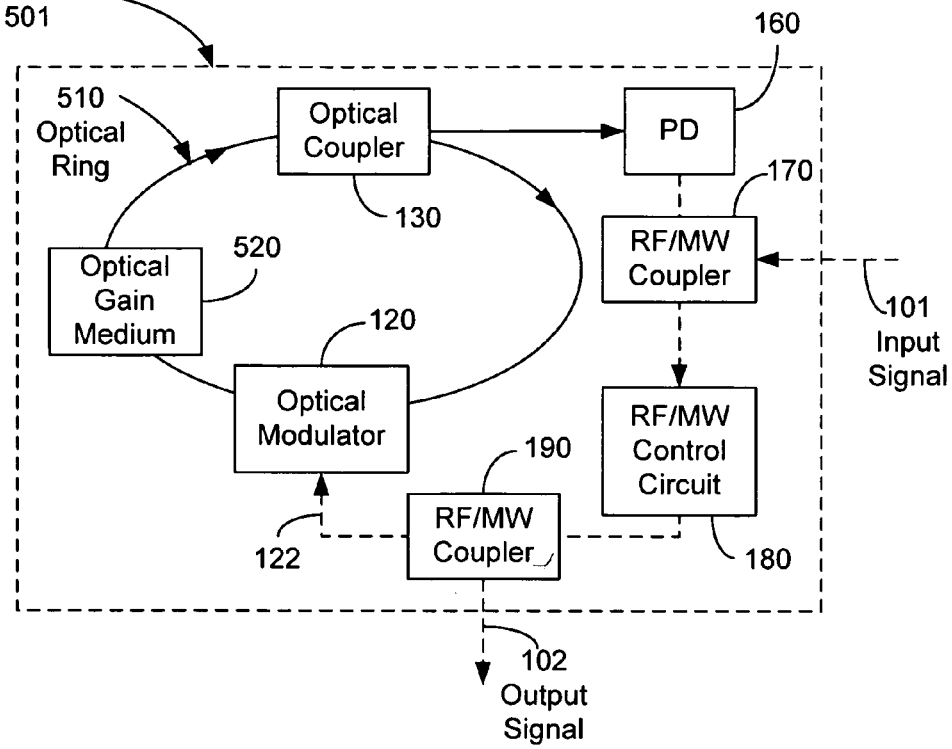
FIGS. 5A, 5B, and 6 show examples of coupled opto-electronic oscillators that may be used for constructing regenerative opto-electronic circuits.
Figure 5B:
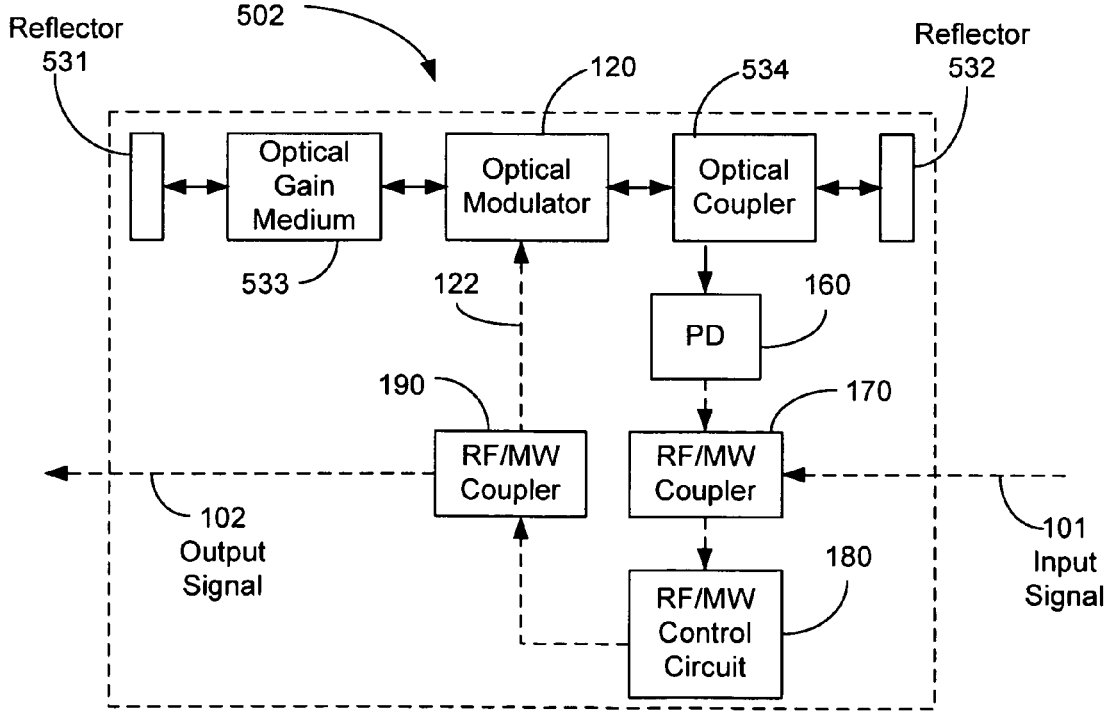

FIGS. 5A and 5B show two examples of regenerative opto-electronic circuits 501 and 502 based on coupled opto-electronic oscillator (COEO) configurations. Examples of COEOs and their operations are described in U.S. Pat. Nos. 5,929,430 and 6,567,436, which are incorporated herein by reference in their entirety. A COEO directly couples a laser oscillation in an optical feedback loop or a laser cavity to an electrical oscillation in an opto-electronic feedback loop. The opto-electronic loop includes an optical section and an electronic section that are interconnected by an optical detector. The optical section may be used to provide a long loop delay that effectively suppress the phase noise in the oscillation signals. Such a long optical delay may be difficult to achieve electronically. The open loop gain for the opto-electronic loop is greater than the corresponding loss so an oscillation can be generated and sustained in the opto-electronic loop. The laser oscillation and the electrical oscillation are correlated with each other so that both the modes and stability of one oscillation are coupled with those of the other oscillation. The optical feedback loop or the laser cavity includes a gain medium to produce a loop gain greater than the optical loss in the laser cavity to effectuate and sustain the laser oscillation. This optical loop may be implemented by an optical resonator. The coupling between two feedback loops is achieved by controlling the loop gain of the optical loop by an electrical signal generated by the opto-electronic feedback loop. COEOs can achieve a single-mode RF or microwave oscillation without a RF or microwave bandpass filter or any additional opto-electronic feedback loops.

The circuit 501 in FIG. 5A has two coupled oscillating loops. The first oscillating loop is a laser ring loop 510 which includes an optical gain medium 520 which may be electrically pumped (e.g., a semiconductor optical amplifier) or optically pumped (e.g., an optical medium doped with active ions) to produce an optical gain at a selected laser wavelength for laser oscillation in the ring 510. An optical modulator 120, which may be a separate element from the gain medium 520 or integrated with the gain medium 520, is inserted in the optical ring 510 to modulate the laser light in response to the control signal 122 from an opto-electronic loop as the second oscillation loop. This second oscillation loop in FIG. 5A include an optical portion which includes the optical ring 510, a photodetector 160 outside the ring 510 to receive an optical output from the ring 510, and a control circuit 180 which processes the output from the photodetector 160 to produce the control signal 122 which is fed back to the optical modulator 120. The control circuit 180 may include circuit elements for signal amplification and filtering. An optical coupler 130 is optically coupled to the ring 510 to produce the optical output to the photodetector 160, and the electrode coupler 1320. These two oscillating loops are optically and electronically coupled to each other.

FIG. 5B shows another circuit 502 based on a different COEO design where the laser ring 510 in FIG. 5A is replaced by a laser cavity formed by two reflectors 531 and 532. An optical gain medium 533 is placed in the laser cavity in the optical path between the reflectors 531 and 532 to produce the optical gain for laser oscillation by either electrical pumping or optical pumping.

The control circuit 180 in both circuits 501 and 502 may be configured for various regenerative operations such as the regenerative filters, regenerative frequency dividers, and regenerative frequency multipliers as described above.

Figure 6:
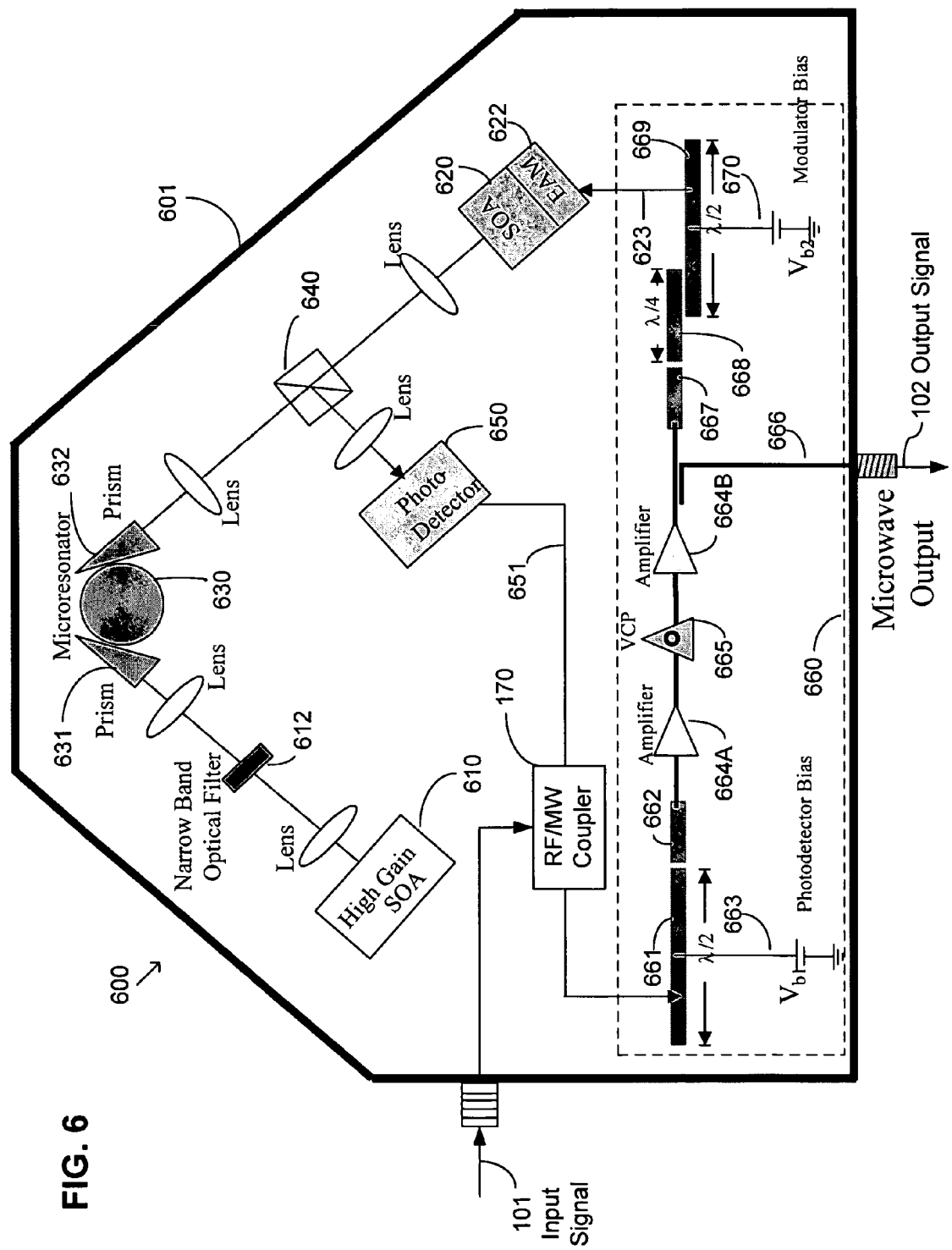

FIG. 6 illustrates an exemplary implementation 600 of the regenerative circuit in FIG. 5B using an intracavity WGM resonator 630. The entire circuit 600 may be placed on a base 601 and is enclosed in a housing. The optical path between optical components may be in free space. Alternatively, optical waveguides such as fibers or waveguides formed on substrates may be used. The laser cavity in the circuit 600 is formed by a first optical gain medium 610 on one side of the WGM resonator 630 as the first end of the laser cavity, and a second optical gain medium 620 and an optical modulator 622 on the other side of the WGM resonator 630 as the second end of the laser cavity. Hence, light inside the laser cavity is reflected between the first optical gain medium 610 and the optical modulator 622 is amplified by the gain media 610 and 620 to sustain a laser oscillation. The light is optically filtered by the WGM resonator 630 and is modulated by the optical modulator 622 in response to a modulation signal 623 that is applied to control the modulation by the modulator 622. An optical beam splitter 640, e.g., an optical beam splitting cube, is placed inside the laser cavity to split a portion of the light generated inside the laser cavity to the optical portion of the opto-electronic loop of the circuit 600. The beam splitter 640 or another optical beam splitter may be used to generate another optical output as the optical output of the circuit 600. For example, a beam splitting cube may be placed between the gain medium 610 and the WGM resonator 630 to split a portion of the beam propagating from the WGM resonator 630 towards the gain medium 610 as the optical output of the circuit 600.

The opto-electronic loop of the circuit 600 includes the beam splitter 640, a photodetector 650, a circuit 660, and the laser cavity as a closed loop to support an oscillation at a frequency of the modulation of light. An electrical link 651 is used to connect the photodetector 650 and the circuit 650 to direct the detector output to the circuit 650. Another electrical link 623 is used to connect the modulator 622 and the circuit 660 to provide the modulation signal to the modulator 622. The circuit 660 may include a signal amplifier (e.g., 664A and 664B) which amplifies the signal received from the photodetector 650, and a voltage controlled phase shifter (VCP) 665 which adjusts the phase of the modulation signal at the modulator 622. The modulation signal from the circuit 660 at the modulator 622 is in phase to generate and sustain the oscillation and is different from a negative feedback loop where the feedback signal is out of phase with the modulation to avoid any oscillation.

The optical gain media 610 and 620 on two sides of the WGM resonator 630 may be designed to have different optical gains. For example, the gain of the medium 610 may be higher than that of the medium 620. Under this configuration, the light in the laser cavity leaving the first gain medium has just passed through the gain medium 610 twice and thus is strongly amplified by the first gain medium 610. The WGM resonator 630 subsequently filters the amplified light to remove light at frequencies outside the resonant frequency of the WGM resonator. This filtering removes various noise signals in the light including the noise caused by ASE in the optical gain media. Accordingly, with a sufficient gain in the medium 610, the light coming out of the WGM resonator 630 towards the second gain medium 620 has more power and less noise than other light beams in the laser cavity. Hence, a portion of this light coming out of the WGM resonator 630 towards the second-gain medium 620 may be directed out of the laser cavity to the optical portion of the opto-electronic loop. Therefore, under this configuration, the optical beam splitter 640 may be placed between the WGM resonator 630 and the second optical gain medium 620 to split light in the laser cavity that travels from the first gain medium 610 towards the second gain medium 620 as the optical output to the photodetector 650.

The first optical gain medium 610 may be a semiconductor optical amplifier (SOA) with a high optical gain, e.g., 15 to 30 dB. The SOA 610 may also be designed to have a high saturation power, e.g., in the range from 16 dBm to 20 dBm. The second gain medium 620 and the modulator 622 may be a second semiconductor optical amplifier and an electro-absorption modulator, respectively. This second semiconductor optical amplifier and the electro-absorption modulator may be an integrated semiconductor device. The optical gain of the second SOA 620 is less than the first SOA 610, e.g., may be at 15 dB or less and its saturation power may also be less than that of the first SOA 610, e.g., in a range from 8 dBm to 12 dBm.

The circuit 600 may also include a narrow band optical filter 612 between the first gain medium 610 and the WGM resonator 630 provide additional optical filtering to further suppress any optical noise. A first optical coupler 631 is located between the first gain medium 610 and the optical whispering gallery mode resonator 630 to couple light into and out of the optical whispering gallery mode resonator 630. A second optical coupler 632 is located between the second gain medium 620 and the optical whispering gallery mode resonator 630 to couple light into and out of the optical whispering gallery mode resonator 630. The couplers 631 and 632 may be prisms or other optical coupling devices. In addition, optical lenses may be placed at selected locations inside the laser cavity to collimate and focus the light. A lens may be placed between the beam splitter 640 and the photodetector 650 to direct the light into the sensing area of the photodetector 650.

The circuit 660 in the electrical portion of the opto-electronic loop represents one implementation of the control circuit 180 in FIG. 5B and may be configured as described above for different regenerative operations. In the illustrated example, the circuit 660 is configured to make the circuit 600 as a regenerative filter.

The detail of the circuit 660 for regenerative filtering in the illustrated example is as follows. A photodetector bias circuit 663 is included to provide an electrical bias to the photodetector 650 via the link 651. The circuit 660 also includes a modulator bias circuit 670 which provides an electrical bias to the electro-absorption modulator 622. A planar electrode strip 661 is used at the input of the circuit 660 to receive the detector signal from the photodetector in an impedance-matched condition. As illustrated a $\lambda/2$ resonance line is used as the strip 661, where $\lambda$ is the wavelength of the oscillation signal in the detector output in, e.g., an RF or microwave frequency. A feed line 662, separate from the line 661, is used to deliver the received signal to the rest of the circuit 660. At the output of the circuit 660, a planar electrode strip 669, e.g., a $\lambda/2$ resonance line, may be used to output the modulation signal to the modulator 622 in an impedance-matched condition. An receiving electrode 667 delivers the modulation signal to a $\lambda/4$ resonance line 668 which is coupled to the electrode 669. Various designs may be used to provide impedance-matching conditions at the input and output of the circuit 660. A signal coupler may be used in the circuit 660 to generate an output for the RF or microwave signal.

The above examples use an opto-electronic loop as the single feedback loop. In other implementations, more than one feedback loop may be provided. An additional feedback loop may be an opto-electronic loop or an electronic loop based on multi-loop OEOs. Multi-loop OEOs use at least one fiber loop in one opto-electronic feedback loop of at least two feedback loops as an energy storage element. Such devices are disclosed in the U.S. Pat. No. 5,777,778 to Yao, which is incorporated herein by reference in its entirety. The different feedback loops have different delays. The opto-electronic feedback loop with the longest delay is used to achieve low phase noise and narrow spectral linewidth. This loop is also used to provide fine frequency tuning since its mode spacing is smaller than any of the other feedback loops. On the other hand, the feedback loop with the shortest delay and the widest mode spacing, either opto-electronic or purely electronic, is used to provide a coarse frequency tuning to achieve a wide continuous tuning range. When operated as an oscillator, the total open loop gain of the multiple loops must exceed the total losses to sustain an opto-electronic oscillation but each loop may have an open loop gain less then the loss in that loop. These and other multiple-loop OEO configurations may be used to form regenerative circuits for certain operating features or advantages in certain applications.

The RF or microwave bandpass filters 330 and 440 use din the above and other regenerative opto-electronic circuits may be implemented in various configurations. In some implementations, such RF or microwave bandpass filters may be all electronic filters that are made of RF or microwave electronic circuit elements. In other implementations, such RF or microwave bandpass filters may be implemented as photonic RF or microwave filters by using both (1) photonic or optical components and (2) RF and microwave components. In photonic RF or microwave filters, a part of the processing is performed in the RF and microwave domain such as applying a microwave or RF input signal to an optical modulator to control optical modulation of light, and another part of the processing is performed in the optical domain such as optical filtering of the modulated light to select one or more desired microwave or RF spectral components as the filtered output. The frequency of a selected spectral component can be tuned by either tuning the frequency of the light that is modulated by the optical modulator or an optical filter that is used to optically filter modulated optical beam.

In one implementation, a photonic RF or microwave filter described here includes an input port to receive an input microwave or RF signal, a laser to produce a continuous-wave laser beam, a first optical path to receive a first portion of the laser beam, and a second optical path to receive a second portion of the laser beam. The second optical path includes an optical modulator to modulate the second portion in response to the input signal to produce a modulated optical beam that carries the input signal, and a tunable optical filter to filter the modulated optical beam to select at least one spectral component in the input signal while rejecting other spectral components and to output a filtered modulated optical beam that carries the at least one selected spectral component. The tunable optical filter includes at least two optical resonators that are optically coupled to produce a filter function of at least a second order. A tuning control unit is provided in the device in this implementation to tune at least one of the two optical resonators to change a frequency of the at least one selected spectral component. In addition, an optical detector is provided to combine the first portion from the first optical path and the filtered modulated optical beam from the second optical path and to produce a filtered output signal comprising the at least one selected spectral component.

The photonic filter may use two whispering gallery mode (WGM) resonators as the two optical resonators which are tunable via an electro-optic effect. The tunable optical filter may include a third electro-optic whispering gallery mode resonator optically coupled to one of the two tunable optical resonators and tuned by the tuning control unit to effectuate a third order filter function in the tunable optical filter.

Alternatively, the tunable optical filter in the photonic filter may be implemented with a first optical waveguide optically coupled to the first and second optical resonators and to receive the modulated optical beam from the optical modulator, and a second, separate optical waveguide optically coupled to the first and second optical resonators to output the filtered modulated optical beam to the optical detector. The first and second optical resonators are directly optically coupled to each other in addition to optical coupling with each other via optical coupling to the first and second waveguides.

As another alternative, the tunable optical filter in the photonic filter may include a first optical waveguide optically coupled to the first and second optical resonators and to receive the modulated optical beam from the optical modulator and to output the filtered modulated optical beam to the optical detector, and a second, separate optical waveguide optically coupled to the first and second optical resonators. The first and second optical resonators are directly optically coupled to each other in addition to optical coupling with each other via optical coupling to the first and second waveguides.

Furthermore, the two optical resonators in the tunable optical filter of the photonic filter may be first and second optical resonators, respectively, and the tunable optical filter may further include third and fourth optical resonators. The first optical resonator receives the modulated optical beam from the optical modulator and the fourth optical resonator outputs the filtered modulated optical beam to the optical detector. The first, second, third and fourth optical resonators are optically coupled to one another in the following manner: the first optical resonator is optically coupled to the second and third optical resonators; the second optical resonator is further optically coupled to the fourth optical resonator; the third optical resonator is further optically coupled to the fourth optical resonator; and the second and third optical resonators are not directly coupled to each other and are indirectly coupled via the first and fourth optical resonators.

Other implementations described in this application perform the frequency tuning in the optical domain by tuning the frequency of the optical beam within the photonic filter. For example, a method for filtering a signal includes applying a microwave or RF signal to an optical modulator to control optical modulation of an optical beam and to produce a modulated optical beam that carries the signal, optically filtering the modulated optical beam to reject undesired signal spectral bands in the modulated optical beam to produce a filtered optical beam that carries at least one selected signal spectral band, tuning a frequency of the optical beam to select the frequency of the at least one selected signal spectral band, combining a portion of the optical beam that is not modulated by the optical modulator and the filtered optical beam into a combined beam, and using an optical detector to convert the combined beam into a filtered microwave or RF signal that carries the at least one selected signal spectral band.

A photonic filter that implements the tuning of the frequency of the optical beam may include, for example, an input port to receive an input microwave or RF signal, a tunable laser to produce a continuous-wave laser beam and to tune a laser frequency of the laser beam, a first optical path to receive a first portion of the laser beam, a second optical path to receive a second portion of the laser beam, and a tuning control unit to tune the laser frequency of the tunable laser. The second optical path includes an optical modulator to modulate the second portion in response to the input signal to produce a modulated optical beam that carries the input signal, and an optical filter to filter the modulated optical beam to select at least one spectral component in the input signal while rejecting other spectral components and to output a filtered modulated optical beam that carries the at least one selected spectral component. Accordingly, the tuning control unit operates to tune the laser and thus change a frequency of the at least one selected spectral component. This device further includes an optical detector to combine the first portion from the first optical path and the filtered modulated optical beam from the second optical path and to produce a filtered output signal comprising the at least one selected spectral component.

In yet another implementation, a microwave or RF signal is applied to an optical modulator to control optical modulation of an optical beam and to produce a modulated optical beam that carries the signal. At least two cascaded optical resonators are used to optically filter the modulated optical beam to reject undesired signal spectral bands in the modulated optical beam to produce a filtered optical beam that carries at least one selected signal spectral band. A frequency of one of the two cascaded optical resonators is tuned to select the frequency of the at least one selected signal spectral band. A portion of the optical beam that is not modulated by the optical modulator and the filtered optical beam are combined into a combined beam. An optical detector is used to convert the combined beam into a filtered microwave or RF signal that carries the at least one selected signal spectral band.

Specific examples of photonic RF or microwave filters are now described blow. Each of the described RF or microwave filters are electrically two-port filters with an input port to receive an input signal 1001 and an output port to output the filtered output signal 1002.

Figure 7A:
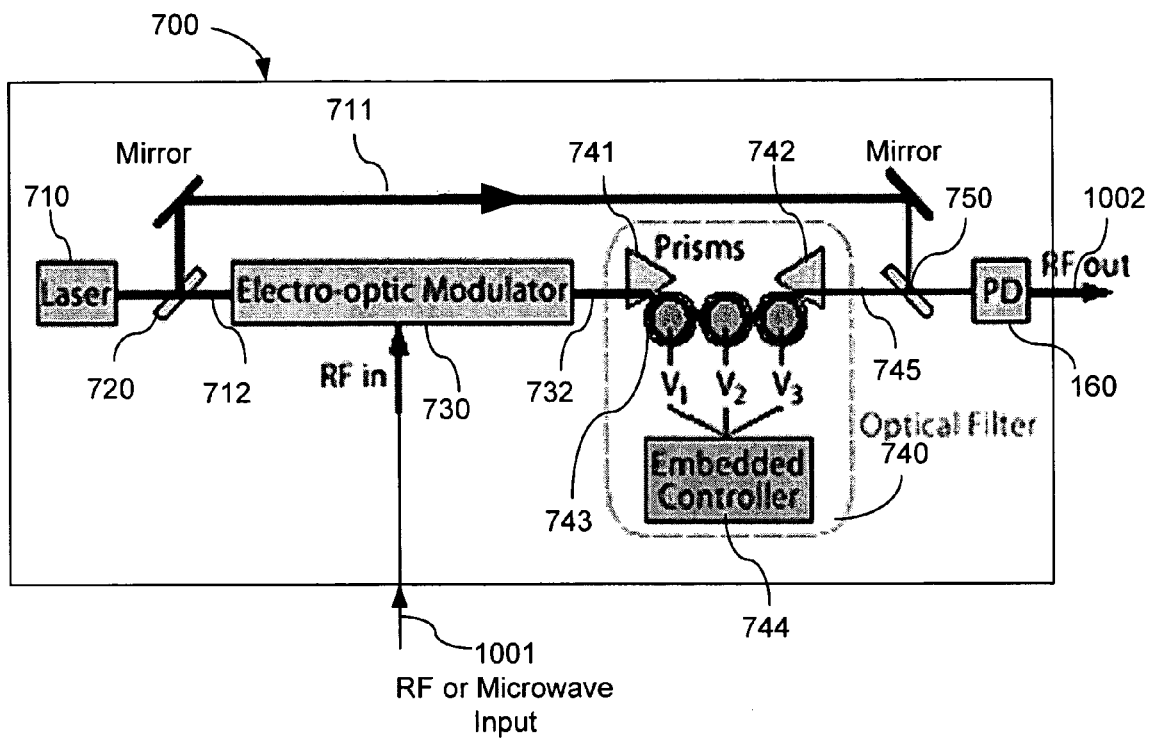
FIG. 7A shows one example of a tunable RF or microwave filter that uses a tunable optical filter for filtering and tuning the output RF or microwave signal.

FIG. 7A shows one example of a tunable microwave or RF filter 700 based on optical filtering and tuning. The filter 700 receives an input microwave or RF signal 1001 and produces a filtered output microwave or RF signal 1002 with one or more spectral components selected from the input spectral components in the input signal 1001. Inside the filter 700, a laser 700, e.g., a diode laser, is used to produce a continuous-wave laser beam. An optical beam splitter or coupler 720 splits the laser beam into a first beam 111 along a first optical path and a second beam 712 along a second, separate optical path. An optical beam combiner 750 is used to combine the light beams from the two optical paths into a combined optical beam. An optical detector or photodetector 160 receives and converts the combined beam into the filtered microwave or RF signal 1002. The two optical paths formed by the beam splitter 120 and the beam combiner 750 create an interferometer: the upper first optical path serves as a reference while the filtering takes place in the lower second optical path. The upper first optical path may include an optical delay element to produce a delay that compensates for the group delay caused by the optical filter 740 in the lower second optical path.

In this specific implementation, the optical filtering and tuning of the output signal 1002 are performed in the lower second optical path. The input RF or microwave signal 1001 is first up-converted into the optical domain using a broadband modulator. The signal filtering is done in optical domain using a tunable high-Q optical filter. The signal tuning is also done in the optical domain by tuning the optical filter to select one or more spectral components. In the lower second optical path, an optical modulator 730, such as an electro-optic modulator, is used to modulate the second optical beam 712 in response to the input signal 1001. This optical modulation produces a modulated optical beam 732 that carries the microwave or RF spectral components in the input signal 1001. The operating bandwidth of the optical modulator 730 is designed to be sufficiently broad to cover the signal frequencies of the input signal 1001. The microwave or RF spectral components in the input signal 1001 appear as optical sidebands at different optical frequencies from the laser frequency of the laser 710. This process converts the microwave or RF spectral components into the optical domain. Therefore, signal filtering and frequency tuning can be performed optically.

Figure 7B:
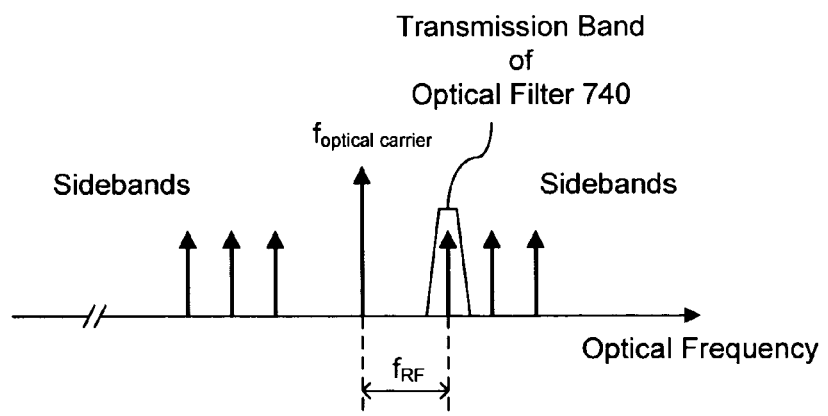
FIG. 7B is a chart illustrating an example of the spectrum of a modulated optical beam that carries the RF or microwave signals bands and the optical filtering by the tunable optical filter in FIG. 7A.

FIG. 7B illustrates the optical spectrum of the modulated optical beam 732. The optical carrier is shown to be at the laser frequency ($f_{optical\ carrier}$) and the RF or microwave signal bands or spectral components originally in the input signal 1001 are now carried by the optical carrier as optical sidebands. Each optical sideband is at an optical frequency and the frequency difference between the each sideband and the optical carrier is the microwave or RF frequency of the original signal band in the signal 1001.

Referring back to FIG. 7A, a tunable optical filter 740 is placed in the second optical path between the optical modulator 730 and the optical combiner 750 to optically filter the modulated beam 732 to produce a filtered optical beam 745. A tuning control unit 744 is provided to produce one or more control signals applied to the filter 740 to tune the optical frequency of the filter's transmission band. If the quality factor of the optical filter 740 is sufficiently high, the bandwidth of the optical filter 740 can be sufficiently narrow to select only one sideband to transmit in the beam 145 while rejecting two neighboring sidebands, all other sidebands and the optical carrier. The optical filter 740 is designed to achieve this filtering operation. FIG. 7B shows that the optical filter 740 is tuned to select the lowest sideband of the upper sidebands in the modulated optical beam 732. As a result, the filtered optical beam 745 has only one spectral component at the optical frequency of ($f_{optical\ carrier} + f_{RF}$).

The first optical beam 711 in the first optical path is not modulated and thus has only the optical carrier. When the first beam 711 and the filtered beam 745 are combined at the optical detector 160, the detection by the optical detector 160 presents the beat signal between the optical carrier and the filtered sideband in the detector 160. Therefore, the frequency of the output signal 1002 from the detector 160 is the difference between the optical frequency of the filtered beam 745 and the first optical beam 711, i.e., the filtered RF sideband at the frequency of $f_{RF}$. This converts the filtered signal down from the optical domain back to the RF and microwave domain. The optical filter 740 can be tuned to select any of the signal sidebands carried by the modulated optical beam 732. As such, the frequency of the RF signal 1002 can be tuned.

The tunable optical filter 740 may be implemented in various configurations. For example, the tuning may be achieved by thermal control of the resonator whose index, dimension, or both change with temperature, mechanical control of the resonator by changing the dimension of the resonator, electrical control, or optical control. Electro-optic materials may be used to control and tune the resonance frequency of the WGM resonator by an external control signal For example, a single lithium niobate microresonator that supports whispering gallery modes is a tunable optical filter based on the electro-optic effect of the lithium niobate material and can be used as the filter 740.

Figure 8A:
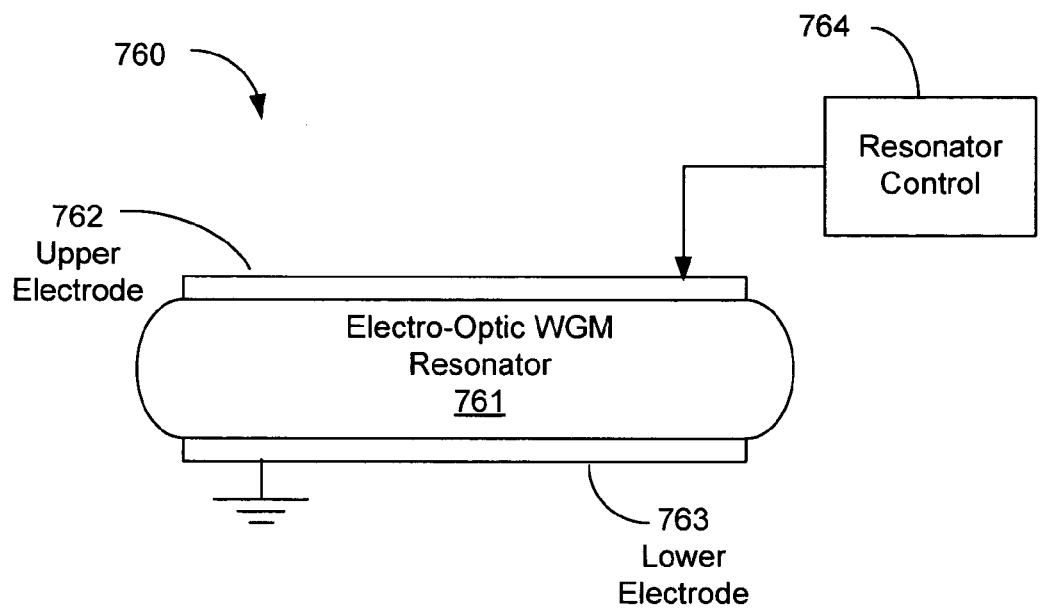
FIG. 8A shows a tunable electro-optic whispering gallery mode microresonator which may be used as a tunable optical filter.

FIG. 8A show an example of a tunable electro-optic WGM resonator 760 having a WGM resonator 761. The electro-optic material for the entire or part of the resonator 761 may be any suitable material, including an electro-optic crystal such as Lithium Niobate and semiconductor multiple quantum well structures. One or more electrodes 7621 and 763 may be formed on the resonator 761 to apply a control electrical field in at least the region where the WG modes are present to control the index of the electro-optical material and to change the filter function of the resonator. Assuming the resonator 761 has disk or ring geometry, the electrode 762 may be formed on the top of the resonator 761 and the electrode 763 may be formed on the bottom of the resonator 210. In implementation, the electrodes 762 and 763 may be in various geometries to apply a control voltage to tune the resonator. For example, the electrodes 762 and 763 may be microstrip line electrodes. A tuning control unit 764 such as a control circuit may be used to supply the electrical control signal to the electrodes 762 and 763. The control voltage may be a DC voltage to set the resonance peak of the resonator 761 at a desired spectral location. The DC voltage may be adjusted by the control unit 764 to tune the spectral position of the transmission peak when such tuning is needed. For dynamic tuning operations, the control unit 764 adjusts the control voltage in response to a control signal to, e.g., maintain the transmission peak at a desired spectral position or frequency or to change the frequency of the transmission peak to a target position. In some other operations, the control unit 764 may adjust the control voltage in a time varying manner, e.g., scanning the transmission peak at a fixed or varying speed or constantly changing the transmission peak in a predetermined manner.

Figure 8B:
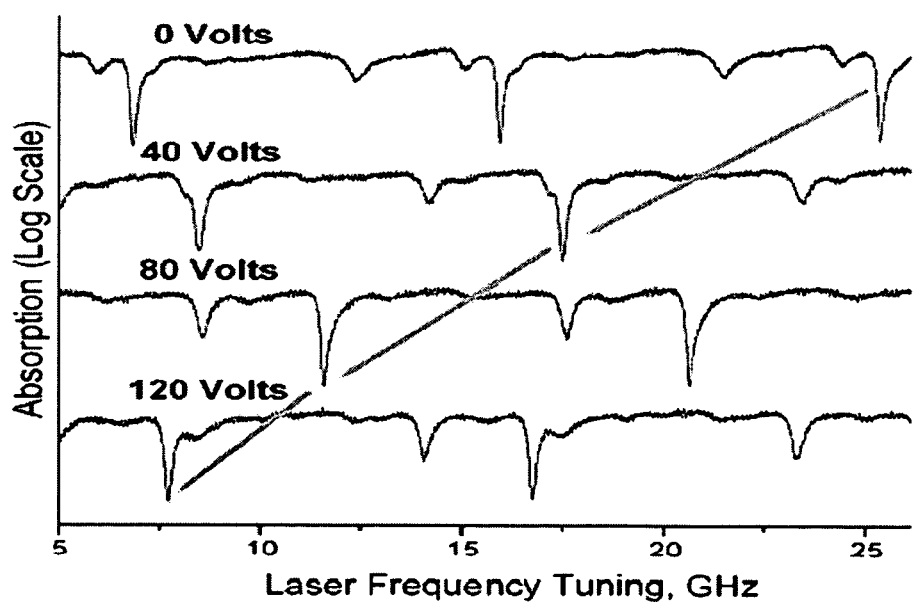
FIG. 8B shows measurements of optical absorption of a lithium niobate whispering gallery mode microresonator with a wide tuning spectral range of the whispering gallery modes under a tuning control voltage.

For example, a Z-cut $LiNbO_3$ disk cavity with a diameter of d=4.8 mm and a thickness of 170 μm may be used as the resonator 761. The cavity perimeter edge may be prepared in the toroidal shape with a 100 μm radius of curvature. As an alternative to the strip electrodes shown in FIG. 8A, the top and bottom surfaces of the disk resonator may be coated with conductive layers for receiving the external electrical control signal. A metal such as indium may be used to form the conductive coatings. Tuning is achieved by applying and adjusting a voltage to the top and bottom conductive coatings. Each conductive coating may be absent on the central part of the resonator and are present at the perimeter edge of the resonator where WGMs are localized. FIG. 8B shows optical absorption measurements on a lithium niobate microresonator showing a wide tunability of the whispering gallery modes with application of a voltage. The curves are offset vertically for clarity.

Such a single-resonator filter has a Lorentzian lineshape in its spectral transmission and presents a less than ideal passband with a relatively slow roll-off from the center transmission peak. When the signal spectral bands in the input signal 1001 are close to one another, the single-resonator filter may not be sufficient to separate neighboring bands. In various implementations, two or more such tunable microresonators may be optically cascaded together in series to create a multi-pole optical filter with a flatter passband and sharper spectral roll-offs. Light can be evanescently coupled between the closely-spaced (e.g., about 1 μm) or directly contacted microresonators.

The shape of the passband function for such a cascaded multi-resonator filter may be controlled by adjusting a number of device parameters. For example, the number of microresonators sets the order of the filter and directly determines how sharply the filter response rolls-off outside the passband. The quality factors of microresonators can determine the natural linewidth of the filter function. Tunable lithium niobate microresonators may be fabricated to produce varying bandwidths, such as narrow linewidths of about 10 MHz or less, or broad linewidths at tens of MHz. The physical gaps that separate the cascaded microresonators (and the coupling prisms at either end of the series from the first and last microresonators) can be adjusted to control the coupling strengths. The gaps may be fixed in certain implementations and adjustable for maximum flexibility in dynamically reconfiguring the filter function in other implementations. Different control voltages to different microresonators may be used to provide desired offsets of the different filter poles relative to a selected center of the filter passband to achieve a desired filter spectral profile. The tuning control unit 144 may include an embedded logic unit that dynamically adjusts the offsets of the filter poles. Accurate placements of the poles can minimize ripple in the final filter passband.

The design of multi-pole optical filters with microresonators may be analogous to design multi-pole RF filters to a certain extent but the design parameters are very different. For example, the equivalent RF Q factors of microresonators are much higher than many RF filters. The equivalent RF Q factor a Microresonator is the optical Q factor multiplied by a ration of the RF frequency over the optical frequency. Hence, at the optical wavelength of 1550 nm, the ratio is about $5 \times 10^{-5}$ and an optical Q factor of $10^9$ is equivalent to an RF Q factor of about $5 \times 10^4$.

Figure 9A:
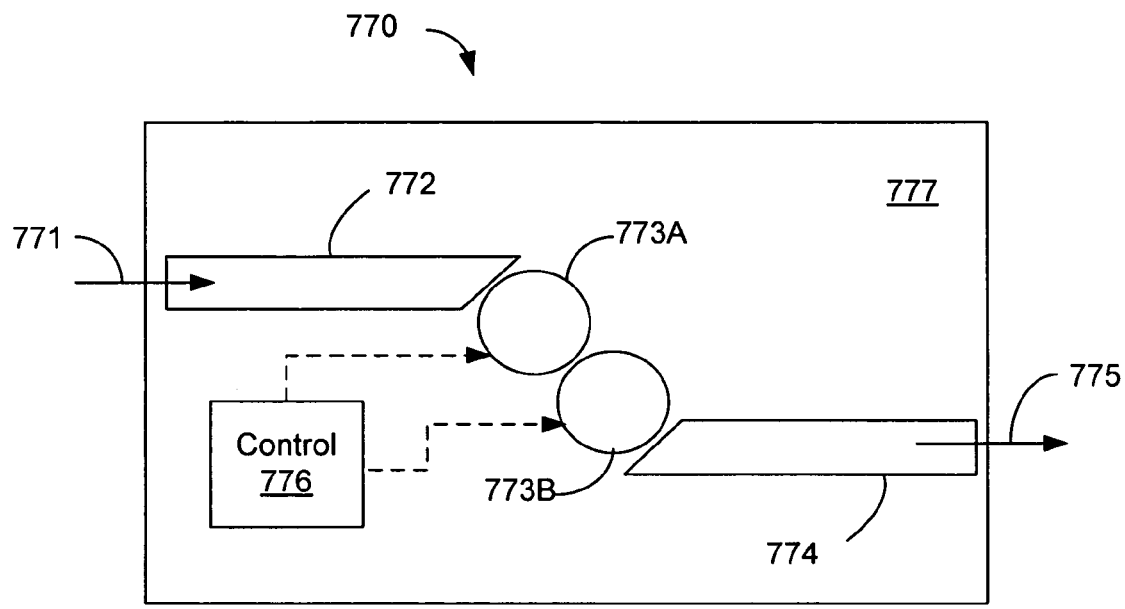
FIG. 9A shows a two-pole tunable optical filter that includes two coupled whispering gallery mode microresonators.

FIG. 9A shows an exemplary tunable two-resonator filter 770 having two cascaded WGM resonators 773A and 773B. In some implementations, both resonators may have approximately the same diameter or dimension to have similar quality factors. In certain other implementations, it may be advantageous to use different resonators 773A and 773B with different geometries or physical dimension to use their difference in the spectral profile to produce the desired composite filter function. The resonators 773A and 773B are placed close to or in contact with each other to allow for direct optical coupling under proper resonance conditions. Alternatively, an optical coupling mechanism may be placed between the resonators 773A and 773B to assist and facilitate the inter-resonator optical coupling. An input optical coupler 772 is placed near or in contact with the first resonator 773A to couple an input optical signal 771 into the first resonator 773A of the filter 770. An output optical coupler 7742 is placed near or in contact with the second resonator 773B to couple optical energy inside the second resonator 773B out to produce an output optical signal 775 as the transmission of the filter 770. As illustrated, a support base 777, such as a substrate, may be used to hold and fix the components of the filter 770 in position. A control unit 776 is provided to control and tune at least one of the resonators 773A and 773B to make the filter 770 tunable. In some implementations, both resonators 773A and 773B may be configured to be tunable.

Figure 9B:
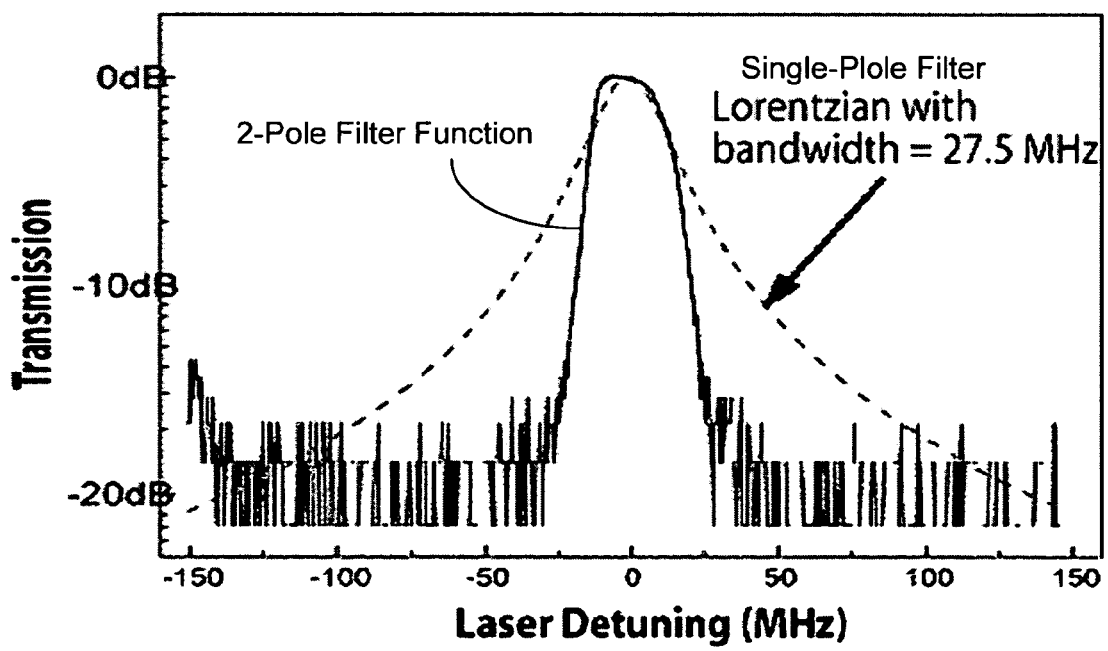
FIG. 9B shows a measured transmission spectrum of a 2-pole optical filter with two silica whispering gallery mode microresonators to illustrate a sharper roll-off than a Lorentzian transmission spectrum of a single microresonator. The floor at −20 dB is an artifact of the measurement and does not represent a limitation of the filter.

FIG. 9B shows a measured spectrum of a 2-pole filter with two silica microresonators coupled in series. A single pole filter function of a single microresonator is shown in a dashed curve as a comparison. The measured 2-pole filter function has a flatter top and sharper spectral roll-off and hence is better suited for filtering different signal bands as illustrated in FIG. 7B.

Figure 10:
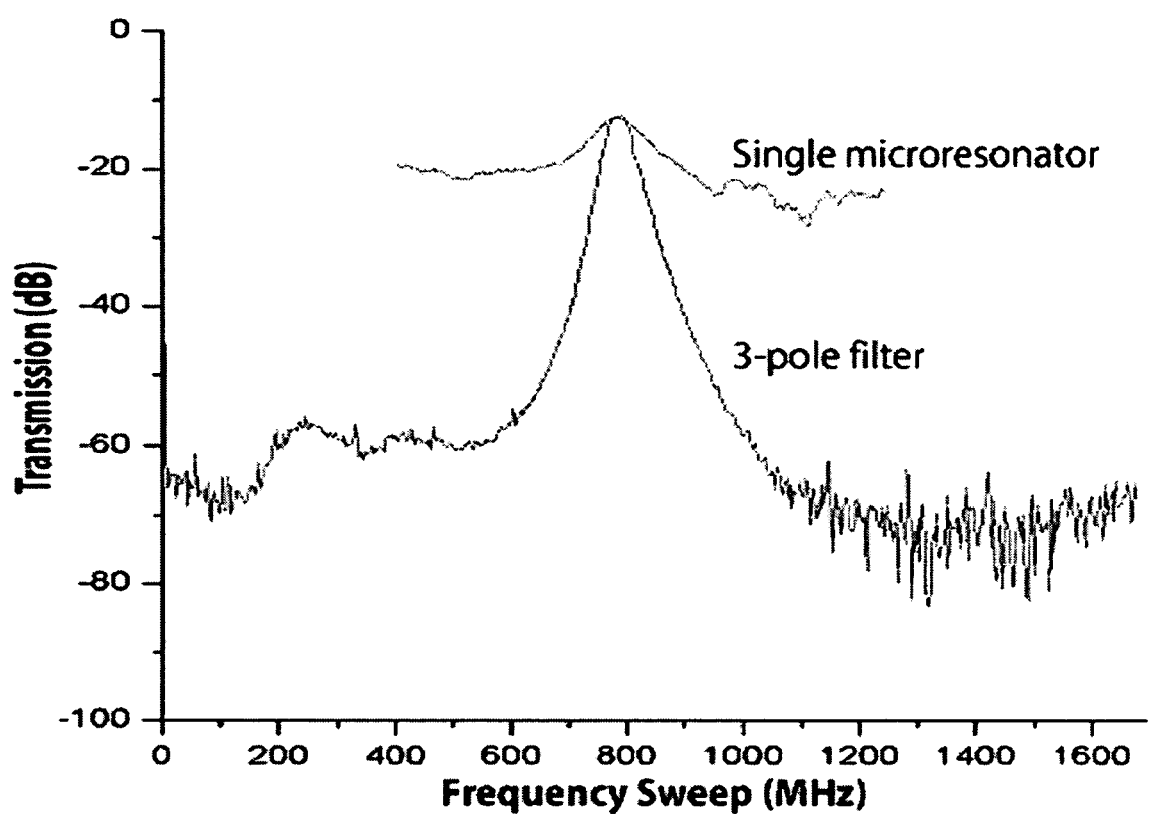
FIG. 10 shows a measured transmission spectrum of a 3-pole lithium niobate optical filter with three cascaded lithium niobate whispering gallery mode microresonators as shown in FIG. 1A. The overlay shows the response of a single-resonator filter with its peak normalized to the peak of the 3-pole response.

FIG. 10 shows measured filter functions for a 3-pole microresonator filter constructed from three lithium niobate microresonators and a single microresonator filter. Tunability was exploited only over a narrow range to set the frequency offsets of the filter poles precisely and optimize the filter transmission function. The filter allows for wide (tens of gigahertz) tunability of filter center frequency with preservation of the shape of the filter's multi-pole transmission function (and thus the filter's performance characteristics) over the same broad range. Additionally, the bandwidth of the filter can be varied by adjusting the loading of resonators by means of changing one or several of the coupling gaps in the filter.

A number of technical issues associated with implementation of multi-resonator filters are addressed below. The electro-optic effect in lithium niobate is evident in FIG. 8B. Hence, the transmission peak frequencies and the corresponding control voltages response should be measured throughout the operating range carefully so that the filter control can be programmed to tune the filter to any desired frequency. The voltages applied to different microresonators in a filter can be controlled independently to ensure proper spacing of the offsets of the pole frequencies. As a filter tunes over its full operating spectral range, the whispering gallery mode amplitudes, shapes and coupling constants of the microresonators may vary slightly. Such variations can be measured and calibrated to control the filter function during tuning. Deliberately shifting the offsets of the pole frequencies relative to the tunable center of the bandpass may be used to compensate for these variations and preserve the optimal shape of the filter function. This additional level of control should also permit some dynamic adjustment of the filter's bandwidth.

Referring back to FIG. 7A, a tunable 3-pole filter is shown as an example for the tunable filter 740. Three electro-optic WGM microresonators 743 are cascaded in series between an input optical coupler 741 and an output optical coupler 742. The couplers 141 and 142 are shown as prisms but other implementations such as angled fiber tip couplers and photonic gap material couplers may also be used. Three separate control voltages V1, V2, and V3 are generated from the control unit 744 to control and tune the three resonators 743, respectively. In other implementations, four or more microresonators may be cascaded to form desired final filter functions.

The tunable optical filter 740 in FIG. 7A may also be implemented by tunable filters that include two or more optical resonators and two separate optical waveguides. The two or more optical resonators that are optically coupled with one another to produce an optical resonance transmission peak that is narrower than the natural transmission linewidth of each resonator. The optical coupling of the resonators causes optical interference between the resonators (e.g., interference of their optical delays) that leads to the narrow transmission peak. The resonators may be directly coupled with one another, indirectly coupled with one another via optical waveguides, or coupled both directly between two adjacent resonators and indirectly via waveguides. At least one of the resonators is tunable to change its resonance frequency to adjust the center frequency of the narrow transmission peak and the optical delay in light spectrally located in the narrow transmission peak. Notably, the described device designs and techniques are applicable to other electromagnetic frequencies outside the optical spectral range, such as the microwave and millimeter frequencies where microwave resonators and waveguides, for example, are used to implement the desired wave coupling and tuning in frequency.

The specific examples described here are in optical domain and use optical waveguides and whispering gallery mode resonators. In particular, device designs with a parallel configuration of two interacting whispering-gallery-mode optical resonators are described to show a narrowband modal structure as a basis for a widely tunable delay line. The optical coupling can be optimized so that such devices produce an unusually narrow spectral feature with a much narrower bandwidth than the loaded bandwidth of each individual resonator.

This effect of the devices described here is analogous to the phenomenon of electromagnetically induced transparency (EIT) in resonantly absorbing quantum systems. The quantum-mechanical interference of spontaneous emissions from two close energy states coupled to a common ground state results in ultranarrow resonances in EIT. The devices and techniques described here produce similar narrow resonances based on classic cavity modes and the interference between direct and resonance-assisted indirect pathways for decays in two coupled resonators. This is the same Fano resonance for optical resonators that has been shown to result in sharp asymmetric line shapes in a narrow frequency range in periodic structures and waveguide-cavity systems.

Figure 11A:
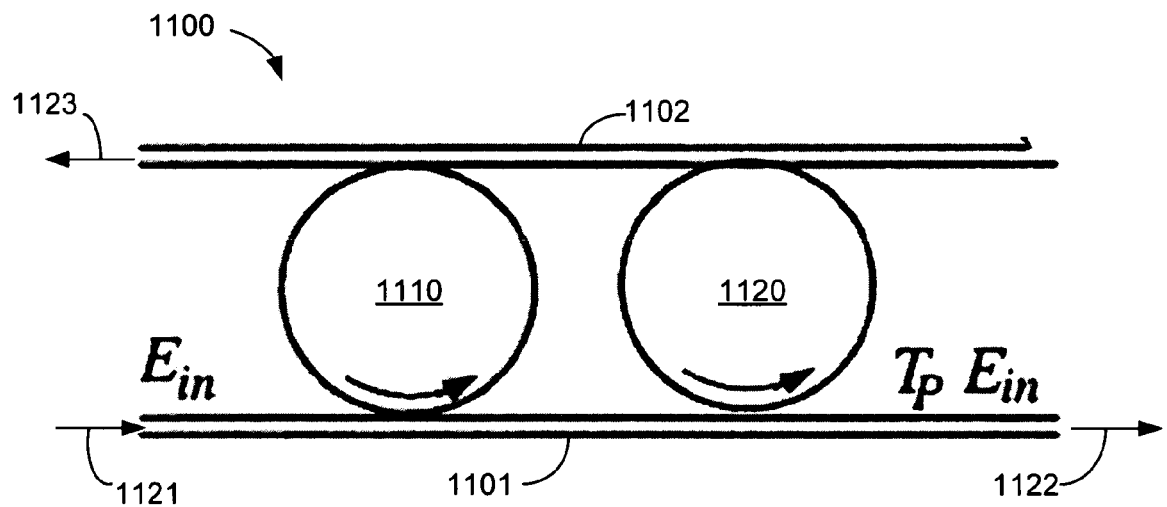
FIG. 11A shows an example of a resonator-based device showing two coupled resonators to produce a narrow transmission peak with tunable peak frequency, delay and spectral linewidth.

FIG. 11A shows one example of a tunable optical filter 500 with two optical resonators 1110 and 1120 optically coupled to two separate optical waveguides 1101 and 1102. The two waveguides 1101 and 1102 are shown to be parallel but may not necessarily so in implementations. The first resonator 1110 is optically coupled to the first waveguide 1101 at a first location of the resonator 1110 to exchange optical energy with the first waveguide 1101 and to the second waveguide 1101 at a second location of the resonator 1110 to exchange optical energy with the second waveguide 1102. The optical coupling with each waveguide may be evanescent coupling. The second resonator 520 is coupled to the waveguides 1101 and 1102 in a similar configuration. The resonators 1110 and 1120 may be implemented in various configurations such as ring resonators and whispering gallery mode (WGM) resonators. A suitable ring resonator may be formed in waveguide rings like fiber rings or integrated waveguide rings on substrates or by three or more reflectors to form a closed optical loop. A WGM resonator may be implemented in a number of configurations, including, microsphere WGM resonators, microdisk WGM resonators with spherical and non-spherical exterior surfaces, and microring WGM resonators with spherical and non-spherical exterior surfaces. The non-spherical exterior surfaces may be spheroidal surfaces of spheroids or conic surfaces. The two waveguides 1101 and 1102 may be implemented by, e.g., fibers and integrated waveguides formed on substrates.

The two resonators 1110 and 1120 may be spaced from each other so there is no direct optical coupling between the two resonators 1110 and 1120. Alternatively, the two resonators 1110 and 1120 may be directly coupled to each other to exchange optical energy without relying on optical coupling via the waveguides 1101 and 1102. Regardless whether there is a direct coupling between the two resonators 1110 and 1120, the two waveguides 1101 and 1102 provide an optical coupling mechanism between the resonators 1110 and 1120. In FIG. 11A, an input optical signal 1121 is shown to enter the first waveguide 1101 as an input $E_{in}$. A portion or the entirety of the signal 1121 is coupled into the first resonator 1110 and circulates in the resonator 1110. A portion of the optical energy in the resonator 1110 is coupled back into the first waveguide 1101 which is subsequently coupled, either partially or entirely, into the second resonator 1120. A portion of the optical energy circulating in the second resonator 1120 is coupled back into the first waveguide 1101 as the transmitted output 1122 represented by $T_p E_{in}$, where $T_p$ is the transmission coefficient of the tunable device 1100. The spectrum of the transmission coefficient $T_p$ includes a narrow transmission peak whose frequency is determined by the resonance frequencies of the two resonators 1110 and 1120.

In the design in FIG. 11A, the second waveguide 1102 produces a reflected optical signal 1123 by coupling with the two resonators 1110 and 1120. The coupling between the waveguide 1102 and the first resonator 1110 couples a portion of the optical energy circulating in the resonator 1110 into the second waveguide 1102 as part of the reflected signal 1123. In addition, the coupling between the waveguide 1102 and the second resonator 1120 couples a portion of the optical energy circulating in the resonator 1120 into the second waveguide 1102 which is further partially or entirely coupled into the first resonator 1110.

Figure 11B:
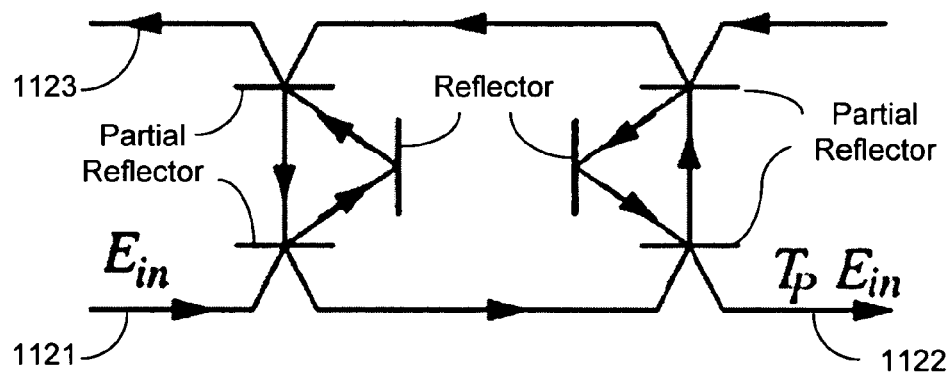
FIG. 11B shows an optical device with two ring resonators that is equivalent to the device shown in FIG. 11A in certain aspects.

Therefore, the optical configuration of the tunable filter 1100 provides an optical circulation and storage mechanism to circulate and retain light between the two resonators 1110 and 1120 and the segments of the waveguides 1101 and 1102 between the resonators 1110 and 1120. A portion of light circulating and stored in the device 1100 is reflected back in the waveguide 1102 as the reflected signal 1123 and another portion of the light is transmitted through the two resonators 1110 and 1120 as the transmitted signal 1122 in the waveguide 1101. FIG. 11B shows optical paths of the device 1100 when the two resonators 1110 and 1120 are two ring cavities each having three reflectors represented by short straight lines.

The spatially overlapping and mixing of light from the two different resonators in FIG. 11A allow for the optical interference to occur and the narrow transmission peak and the circulation of light between the two resonators 1110 and 1120 leads to the optical delay for light in the narrow transmission peak. The following sections provide detailed explanation for the occurrence of the subnatural (i.e., narrower than loaded individual resonator 1110 or 1120) EIT-like linewidths. Such a device may be operated as a slow light element to produce a variable or tunable optical delay in an optical signal. Notably, one or all of the resonators 1110 and 1120 may be tunable resonators to tune the spectral linewidth, the delay time, and the frequency of the narrow transmission peak of the device 1100. Such a tunable resonator may be designed to include various tuning mechanisms that change the resonance frequency of the resonator in response to an external control signal. As an example, WGMs in electro-optic crystalline WGM resonators may be used to provide tuning in frequency and bandwidth in the device 100 in FIG. 1A by adjusting a control signal applied to electrodes formed on the tunable resonator 110 or 120. The device in FIG. 1B may be tuned by adjusting one or more reflectors in each ring resonator to change the resonance frequency of the ring resonator via a suitable positioning mechanism that controls the position of the mirror under control, e.g., a piezo transducer.

The transmission coefficient for the tunable device 1100 in FIG. 11A can be mathematically expressed as follows:

$$T_P = \frac{[\gamma + i(\omega - \omega_1)][\gamma + i(\omega - \omega_2)]}{[2\gamma_c + \gamma + i(\omega - \omega_1)][2\gamma_c + \gamma + i(\omega - \omega_2)] - 4\exp(i\psi)\gamma_c^2}, \quad (1)$$

where $\gamma$ and $\gamma^c$ are spectral linewidths caused by intrinsic cavity losses and coupling to the waveguides 1101 and 1102, respectively; frequencies $\omega_1$, and $\omega_2$ are resonance frequencies of modes of the resonators 1110 and 1120, respectively; the frequency $\omega$ is the carrier frequency of the input light; and $\psi$ stands for the coupling phase that varies with the distance between the two resonators 1110 and 1120.

Consider a strong coupling regime $\gamma_c \gg |\omega_1 - \omega_2| \gg \gamma$ in the tunable device 1100. Assuming the frequency tunings between the input light and the resonance frequencies of the two resonators 1110 and 1120, $|\omega - \omega_1|$ and $|\omega - \omega_2|$, to be much less than the free spectral ranges of the two resonators 1110 and 1120 and let $\exp(i\psi)=1$, the power transmission of the tunable device 1100 based on the above transmission coefficient shows two minima, $$|T_p|_{min}^2 \simeq \gamma^2/4\gamma_c^2,$$

when the frequency of the input light is tuned to the resonance frequencies of the two resonators 1110 and 1120: $\omega=\omega_1$ and $\omega=\omega_2$. Notably, the power transmission of the device 1110 also has a local maximum at the average frequency of the two resonance frequencies of the resonators 1110 and 1120, $\omega=\omega_0=(\omega_1+\omega_2)/2$. The local maximum is given by $$|T_P|_{max}^2 \simeq \frac{(\omega_1 - \omega_2)^4}{[16\gamma\gamma_c + (\omega_1 - \omega_2)^2]^2},$$

Figure 11C:
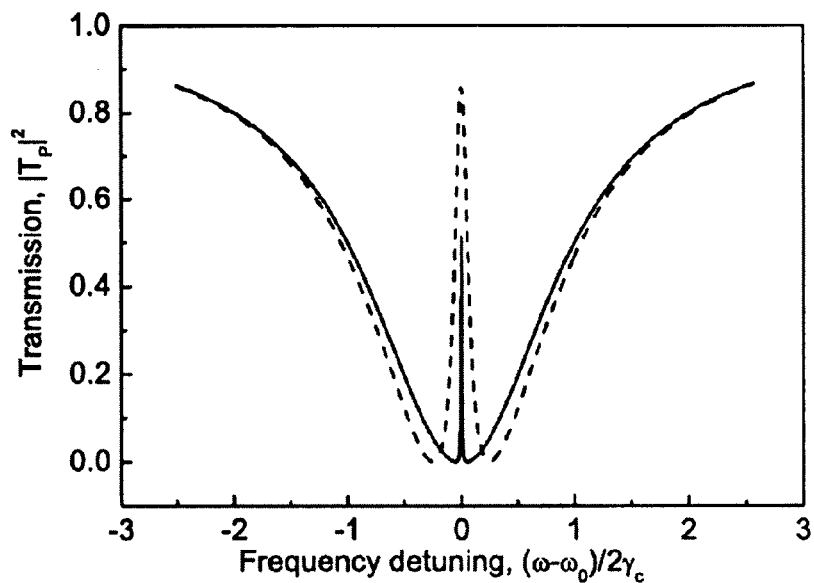
FIG. 11C shows a transmission spectrum of the transmitted signal in the device in FIG. 11A where the resonators are optical whispering gallery mode (WGM) resonators that are not directly coupled to each other and are coupled via two optical waveguides.

This local maximum is the peak of a narrow transparency feature or transmission peak whose spectral position and linewidth can be tuned by tuning either one or both of the resonators 1110 and 1120. FIG. 11C illustrates this transmission peak from the device in FIG. 11A. The device in FIG. 11B can also be used to achieve this transmission peak. Notably, when each resonator is lossless ($\gamma=0$), the width $\Gamma$ of the transparency feature may be arbitrarily narrow and is given by $$\Gamma \simeq \frac{[16\gamma\gamma_c + (\omega_1 - \omega_2)^2]^2}{16\gamma_c(\omega_1 - \omega_2)^2}. \quad (2)$$

That is, the frequency difference between the resonance frequencies of the two resonators 1110 and 1120 can be reduced to reduce the width $\Gamma$ by tuning one or both of the resonators 1110 and 1120. The group time delay that is originated from the narrow transparency resonance in the transmitted light is approximately $\tau_g \approx \Gamma^{-1}$:

$$\tau_g \simeq \frac{16\gamma_c(\omega_1 - \omega_2)^2}{[16\gamma\gamma_c + (\omega_1 - \omega_2)^2]^2} \gg \gamma_c^{-1}.$$

Therefore the turnable device 1100 can produce a large and tunable optical delay in transmitted light and operate as an efficient source of slow light. This tunable delay exceeds the minimum group delay available from a single resonator.

The origin of this subnatural structure in the transmission spectrum of the tunable device 1100 with coupled resonators 1110 and 1120 lies in the interference of the optical decays in the resonators 1110 and 1120. In fact, in the over coupled or strong regime considered here, the resonators 1110 and 1120 decay primarily into the waveguides 1101 and 1102 rather than the free space around the resonators 1110 and 1120. As such, there are several possible optical paths for photons transmitted through the resonators 1110 and 1120, and the photons may interfere because they are localized in the same spatial configurations determined by the waveguides 1101 and 1102. The optical transmission of the tunable device 1100 is nearly canceled when the light is resonant with one of the resonant modes, $\omega_1$ or $\omega_2$, of resonators 1110 and 1120. However, the interference between the resonators 1110 and 1120 results in a narrow transmission resonance.

Figure 12A:
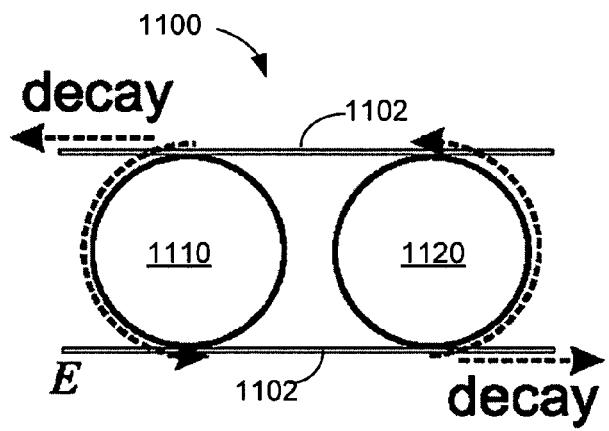
FIG. 12A shows the optical path ways in the optical device described in FIG. 11A for producing the interference between decays of the two WGM resonators.
Figure 12B:
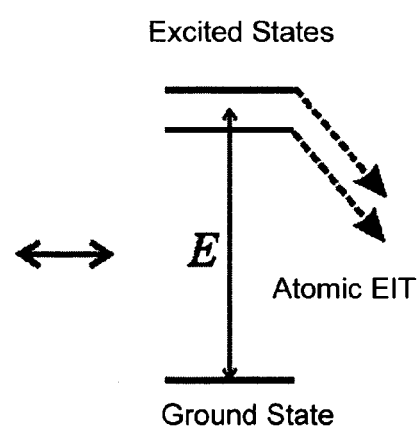
FIG. 12B shows an analogous atomic system that produces electromagnetically induced transparency under proper optical pumping.

FIG. 12A illustrate the path ways for the interference in the tunable device 1100. This phenomenon is similar to the narrow transparency of EIT originating from the decay interference shown in FIG. 12B for a typical three-level atomic system that may be used to produce EIT. The delays of the two close excited states interfere with each other to produce the narrow transparent peak at a frequency where light would be strongly absorbed in absence of the delay interference.

The tunable device 1100 and other devices described here based on coupled optical resonators as optical delay lines and optical filters have several advantages over the atomic, slow light systems. For example, the resonator-based devices described here produce an optical delay that depends on the frequency difference $(\omega_1-\omega_2)$ between the resonant frequencies of the two resonators. Since at least one of the resonators in the devices described here is a tunable resonator, this frequency difference can be tuned to tune the delay time. The tuning may be accomplished easily, for example, by use of resonators made from electro-optic materials such as certain crystals like lithium niobate crystals. The delay time corresponds to linewidth of the device. Hence, the linewidth can be changed or tuned by tuning one or more tunable resonators in the device. This tunable linewidth may be changed in a wide range based on the designs of the resonators, e.g., from hundreds of kilohertz to several gigahertz.

Another advantage of the current devices is that the frequency of the transparency peak is the average frequency of the two resonance frequencies of the two resonators 1110 and 1120, $[(\omega_1+\omega_2)/2]$, and thus is arbitrary in the sense that it is tunable by changing either or both of the resonance frequencies $\omega_1$ and $\omega_2$. Notably, the frequency of the transmission peak is continuously tunable in a wide tuning range and thus can be tuned to any desired frequency within the tuning range. This tuning capability is desirable in many applications such as devices or modules that use optical filtering devices and optical switching devices.

In addition, the resonator-based devices described here can be designed to have much lower optical losses because WGM resonators may be designed and manufactured to have very high quality factors on the order from $10^6$ to $10^9$.

The tunable device 1100 in FIG. 11A uses optical coupling of two optical resonators to achieve narrow spectral features and to tune at least one of the resonators to adjust the spectral features. The linewidth of the transmission peak of the tunable device 1100 could be much narrower than the spectral width of each loaded resonator. The lower limit of the linewidths of such features is limited by optical losses caused by the intrinsic absorption and scattering in the resonator material and the resonator exterior surfaces. The design for the tunable device 1100, however, is not limited to the configuration with two resonators. One or more additional optical resonators may be coupled to the two resonators 1110 and 1120 via the waveguides 1101 and 1102 to form tunable devices with a chain of three or more coupled resonators.

In the above examples, two adjacent optical resonators are not directly coupled to each other but are indirectly coupled via the waveguides 1101 and 1102. Alternatively, two adjacent optical resonators, such as 1110 and 1120, may be directly coupled to each other provide direct exchange of energy between the resonators 1101 and 1102 in addition to the optical coupling via the waveguides 1101 and 1102. As one example, the two resonators 1110 and 1120 may be sufficiently close to or in direct contact with each other to exchange optical energy via evanescent fields of the resonant modes of the two resonators. In addition, an optical coupling element may be used between the two resonators 1110 and 1120 to provide this direct optical coupling without relying on the waveguides 1101 and 1102. Examples of the optical coupling element include an optical grating, which may be inserted between the resonators or directly formed on the surface of at least one resonator, and a photonic band gap material inserted between the resonators. This direct optical coupling between two adjacent optical resonators in combination with the optical coupling via the waveguides provides unique spectral features in devices for high-order optical filtering.

Figure 13A:
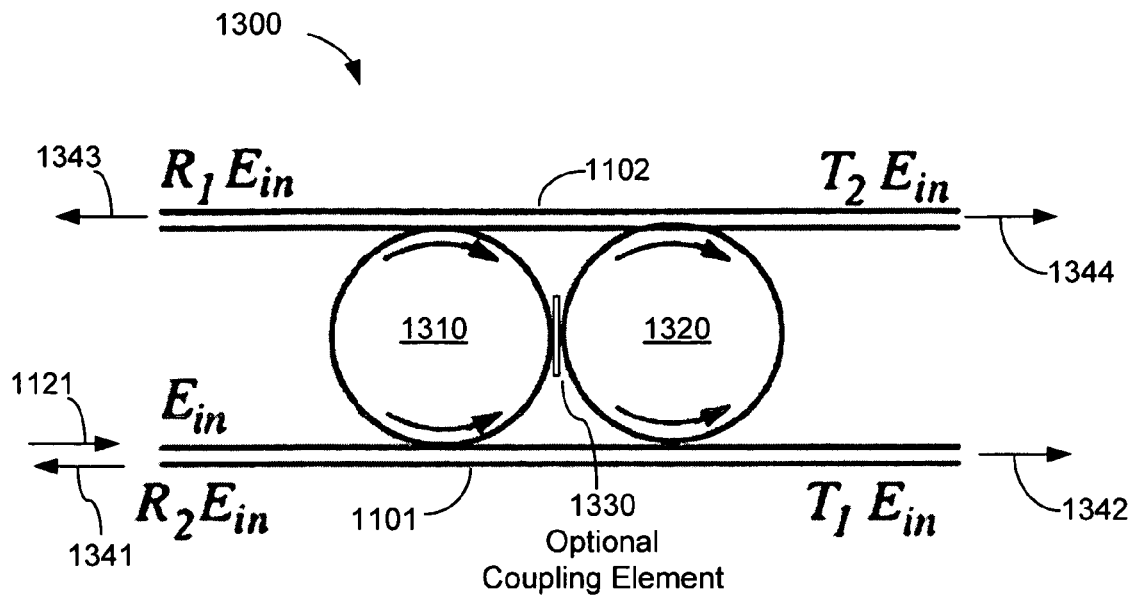
FIG. 13A shows another example of a resonator-based device where two resonators are directly coupled to each other in addition to coupling via two waveguides.

FIG. 13A shows a device 1300 that use two separates optical waveguides 1101 and 1102 to couple two optical resonators 1310 and 1320 in a similar configuration as in the device 1100 in FIG. 11A. However, different from the device 1100, the two resonators 1310 and 1320 are directly coupled to each other to exchange optical energy with or without an optical coupling element 1330 between the resonators 1310 and 1320. In one implementation, the resonators 1310 and 1320 are placed close enough to have a nonzero side coupling. Hence, the resonators 1310 and 1320 are coupled to each other via two different mechanisms: the indirect coupling via the waveguides 1101 and 1102 and direct coupling without the waveguides. The present of this new direct coupling adds additional path ways for the optical signals to overlap and mix.

Referring back to FIG. 11A, without the direct coupling between the two resonators 1110 and 1120, the optical signals in both resonators circulate in the clockwise direction when the input signal 1121 is directed into the device 1100 via the first waveguide 1101 as illustrated. Two output signals are generated: the reflected signal 1123 to the left side of the second waveguide 1102 and the transmitted signal 1122 to the right in the first waveguide 1101. In comparison, the same input signal 1121, in the presence of the direct coupling between two resonators 1310 and 1320 in the device 1300, will lead to counter-propagating signals in each of the two resonators 1310 and 1320 and four output signals 1341, 1342, 1343, and 1344. The signal 1341 is the first reflected signal from the device 1300 in the first waveguide 1301, the signal 1342 is the first transmitted signal in the first waveguide 1301, the signal 1343 is the second reflected signal in the waveguide 1102 and the signal 1344 is the second transmitted signal in the waveguide 1102.

One notable effect of the added direct coupling in device 1300 is that a third-order filter function can be generated with the two resonators 1310 and 1320. This is in contrast to previous belief that a second-order filter function is generated by cascading two WGM resonators.

Figure 13B:
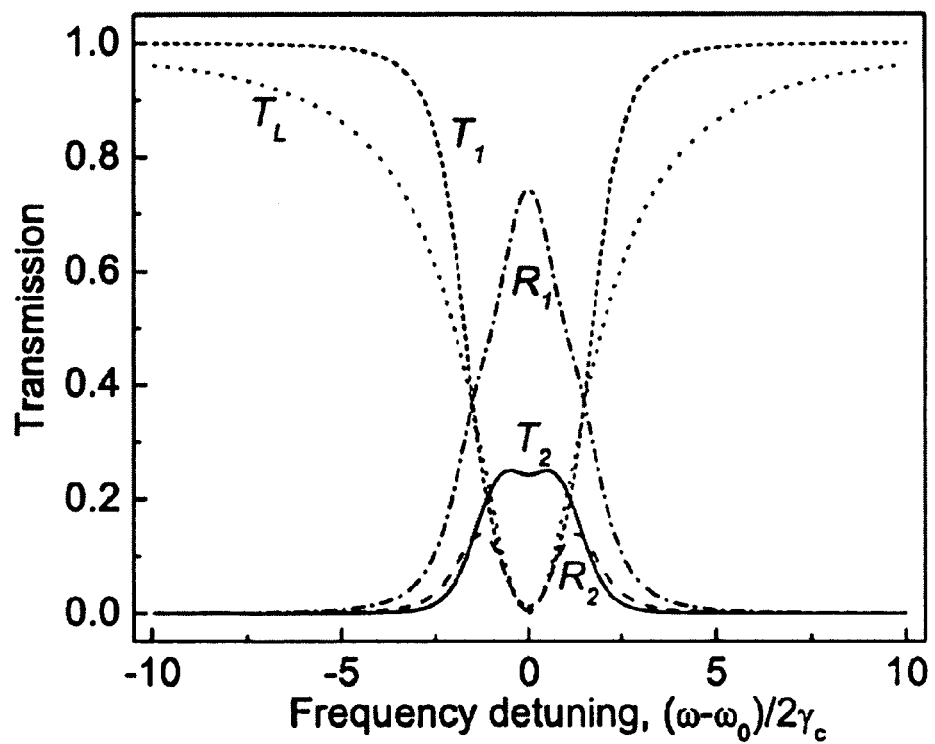
FIG. 13B shows the signal spectra in the device in FIG. 13A when the resonators are WGM resonators.
Figure 13C:
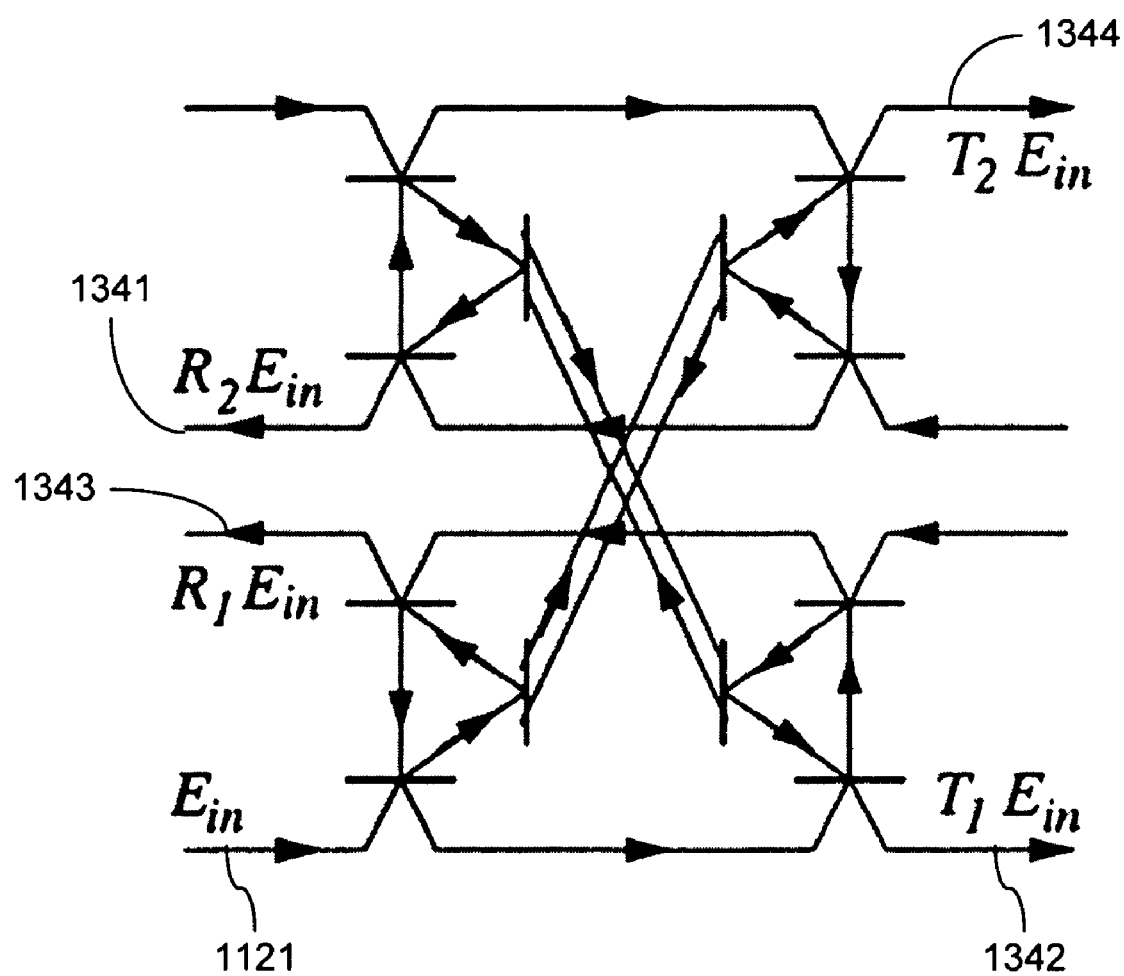
FIG. 13C shows an optical device with four ring resonators that is equivalent to the device shown in FIG. 13A in certain aspects.

FIG. 13B shows the spectra of the two transmitted signals 1342 and 1344 in FIG. 13A. The amplitudes of the transmission and reflection decrease as the third power of the detuning from the central filter frequency $\omega_o$. This unusually increased order filter function arises from the presence of two degenerate modes in each optical resonator (e.g., ring resonator or WGM resonator). With indirect coupling via the waveguides 1101 and 1102 and the direct coupling between the resonators 1310 and 1320, the device 1300 becomes equivalent to a system of four coupled ring resonators when all those four modes are coupled as shown in FIG. 13C. The narrow spectral feature is absent from the spectra in FIG. 3B because of the choice of coupling phase ψ=π/2 used in the computations shown in FIG. 13B for the device 1300 and will be present when the coupling phase is π. Therefore, the device 1300 can be used as a high-order optical filter that has a much flatter passband and a sharper roll-off than a Lorentzian transfer function filter based on a single resonator, and than a second-order filters that use two cascaded resonators without the complex coupling shown in FIG. 13A.

The device 1300 may have one or more resonators that are tunable to tune the spectral response of the device 700. Similar to the device 1100 in FIG. 11A, one or more resonators may be added between the waveguides 1101 and 1102 in device 1300.

Figure 14:
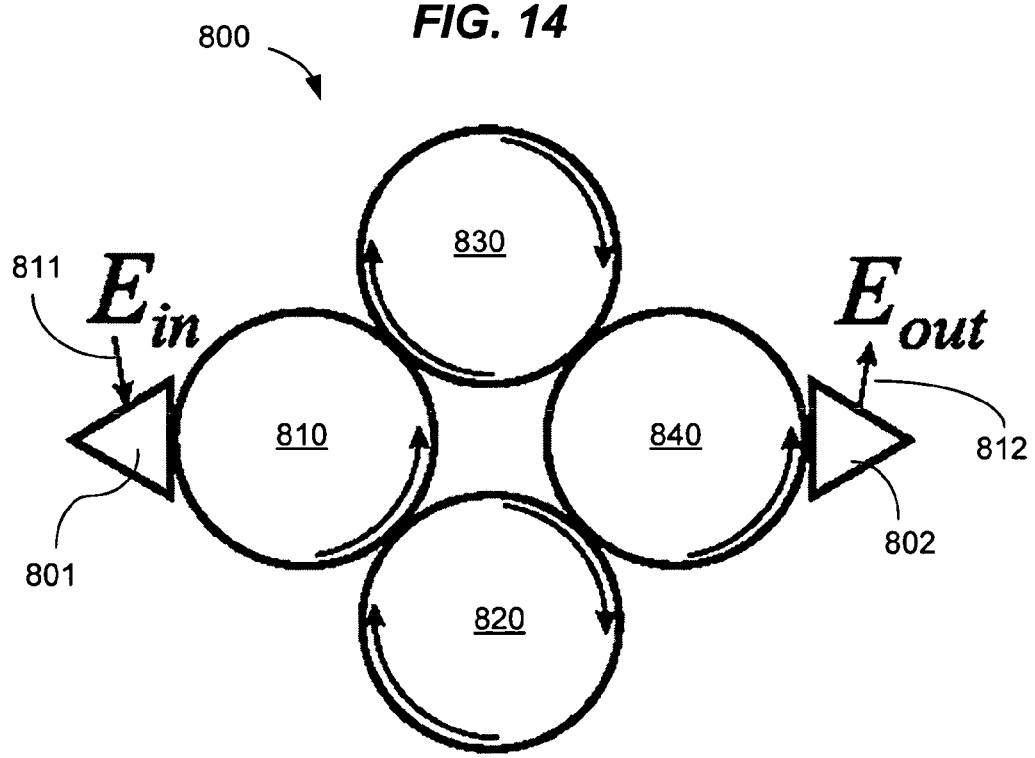
FIGS. 14 and 15 show resonator-based devices with four coupled resonators in two different configurations.

FIG. 14 shows another resonator-based device 800 having four directly coupled optical resonators 810, 820, 830, and 840. The resonators may be implemented as, for example, ring resonator or WGM resonators. The direct coupling between two resonators may be effectuated by close proximity or direct contact via evanescent fields, or by using an optical coupling element between two coupled resonators. An input optical coupler 801 is used to couple an input signal 811 into the resonator 810 and an output optical coupler 802 is used to couple light out of the resonator 840 as an output signal 812. Micro prisms, tapered fibers, photonic band gap materials, and others may be used as the optical couplers 801 and 802. The direct coupling between two resonators is the sole coupling mechanism to keep the light circulating within the four resonators. As illustrated, the optical signals in the resonators 810 and 820 are in the counter clockwise direction while the optical signals in the resonators 820 and 830 are in the clockwise direction. There is no reflected signal in the device 800. The device 800 may have one or more resonators that are tunable to tune the spectral response of the device 800.

Figure 15:
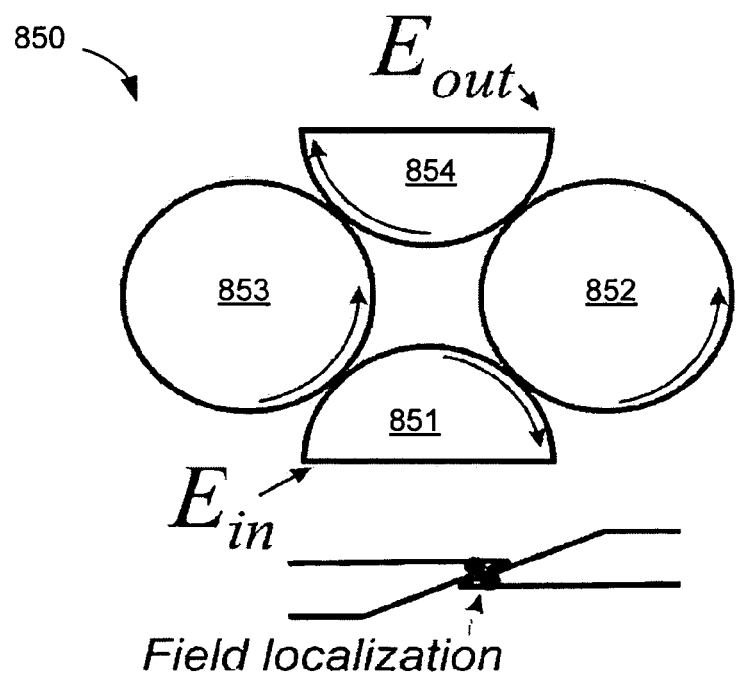

FIG. 15 shows another 4-resonator device 850 where resonators 851, 852, 853, and 854 are optically coupled to one another similar to the device 800 in FIG. 14. Hence, like the device in FIG. 14, the direct coupling between two resonators in device 850 may be effectuated by close proximity or direct contact via evanescent fields, or by using an optical coupling element between two coupled resonators. The input resonator 851 and the output resonator 852 may be half spheres or half disks to allow input and output optical coupling while resonators 852 and 853 are spheres or disks.

The above specific examples of tunable RF or microwave filters based on optical filtering and tuning use optical tunability of the optical filter 740 in FIG. 7A to optically select a spectral component or signal band from the original input signal 1001 and thus tune the frequency of the output signal 1002. The optical tuning is essentially to change the frequency difference between the optical carrier of the modulated optical beam 732 and the center frequency of the transmission passband of the optical filter 740 so that the optical filter can optically select any of the signal bands in the input signal 1001 carried by the optical carrier as the output signal 1002.

Hence, the optical tuning may be achieved by tuning either one or both of the optical carrier frequency of the optical beam and the center frequency of the transmission passband of the optical filter. In some implementations, it is beneficial to use a tunable filter as shown in FIG. 7A and a fixed laser. In other implementations, it may be beneficial to tune the laser frequency while using a fixed optical filter. Hence, optical tuning may be achieved by tuning the frequency of the optical carrier, e.g., the laser frequency of the laser 110 relative to the center frequency of the transmission passband of the filter 740. Accordingly, the filter 740 is replaced by a fixed narrowband high-Q optical filter and the laser 710 is replaced by a tunable laser that can be tuned over-the tuning range of the tunable RF or microwave filter. It is further contemplated that the laser and the optical filter may both be tuned to expand the tuning range of the tunable RF or microwave filter.

Specific tunable RF and microwave filters with tunable lasers and fixed optical filters are described below as examples.

Figure 16:
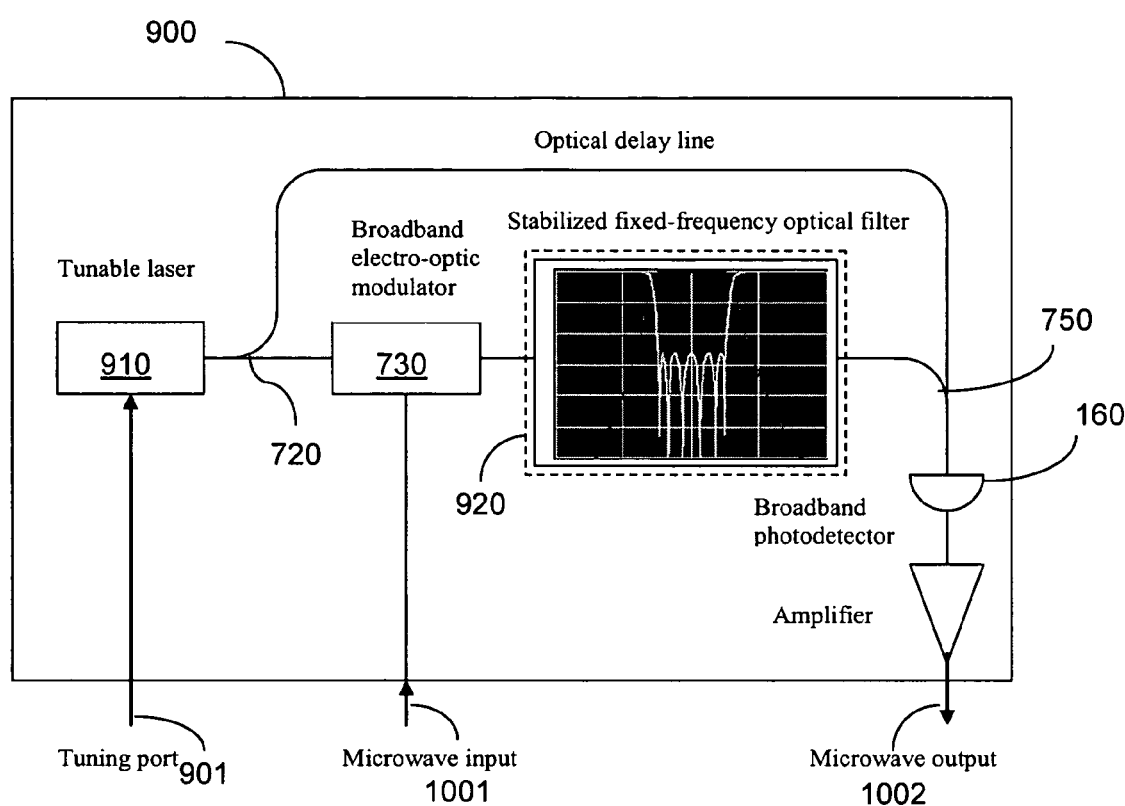
FIG. 16 shows an example of a tunable RF or microwave filter with a tunable laser to tune the laser frequency relative to the center frequency of the transmission band of the optical filter in tuning the frequency of the filtered RF or microwave output signal.

FIG. 16 shows an example of a tunable RF or microwave filter 900 that uses a tunable laser 910 to achieve the tuning and a fixed optical filter 920 to achieve the filtering. The RF or microwave signal 1001 is up-converted into the optical domain using the broadband modulator 730 and the filtering is done in optical domain using the fixed frequency high-Q optical filter 920 which may be a single-pole or a multi-pole filter. The RF signal is restored by recombining the filtered optical beam with optical carrier on the broadband photodetector 160. The laser frequency of the laser 910 is controlled by and tuned in response to a tuning control signal 901 received at a tuning port from a control unit.

Figure 17:
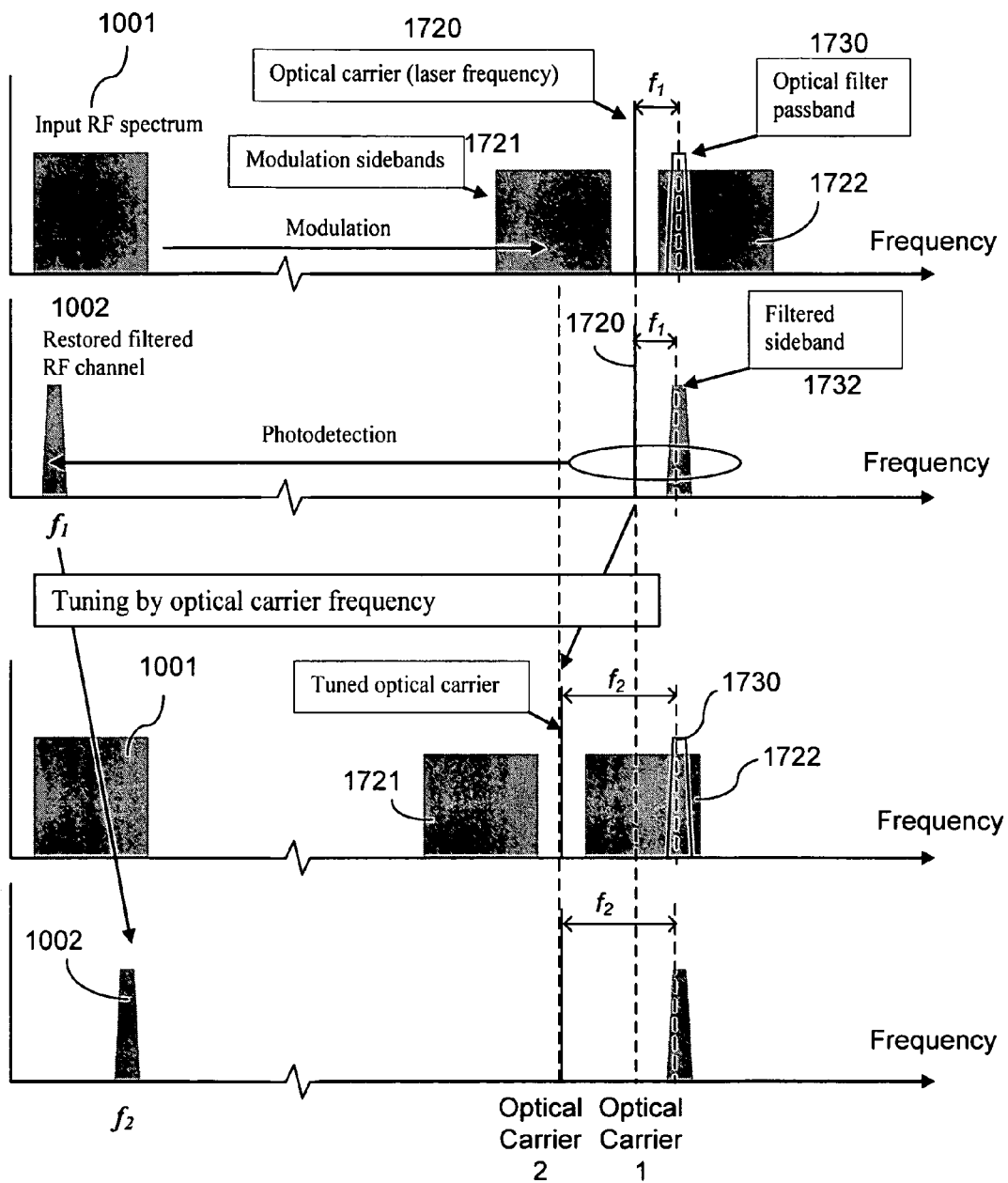
FIG. 17 shows spectra of the modulated optical beam that carries the RF or microwave signal bands of the input RF or microwave signal and the optically filtered modulated optical beam to illustrate operations of the filter in FIG. 16.

FIG. 17 illustrates operation of the filter 900 in FIG. 16. The input RF signal 1001 has an input RF spectrum as shown and is converted via the optical modulation by the modulator 730 into two modulation sidebands 1721 and 1722 on opposite sides of the optical carrier 1720. Any one of modulation sidebands 1721 and 1722 may be used to select a particular RF signal band as the output signal 1002. As an example, the laser 910 is tuned to place a signal band in the modulated optical beam at ($f_{optical\ carrier}$+f1) within the fixed passband 1730 of the optical filter 920. The filtered signal band out of the optical filter 920 is represented by numeral 1732. The optical detection of the optical carrier 1720 and the filtered signal band 1732 produces the output signal 1002 at the selected frequency f1.

If the laser 910 is subsequently tuned to change the optical carrier 1720 to a different optical carrier, e.g., the optical carrier 2 at a lower frequency then the initial optical carrier 1, this tuning shifts frequencies of the modulation sidebands 1721 and 1722 to lower frequencies by the same amount. This change in the optical carrier frequency places a different part of the upper modulation sideband 1722 within the fixed passband 1730 of the optical filter 920 to select a signal band with a higher frequency f2 as the filtered output signal 1002 from the optical detector 160.

Figure 18:
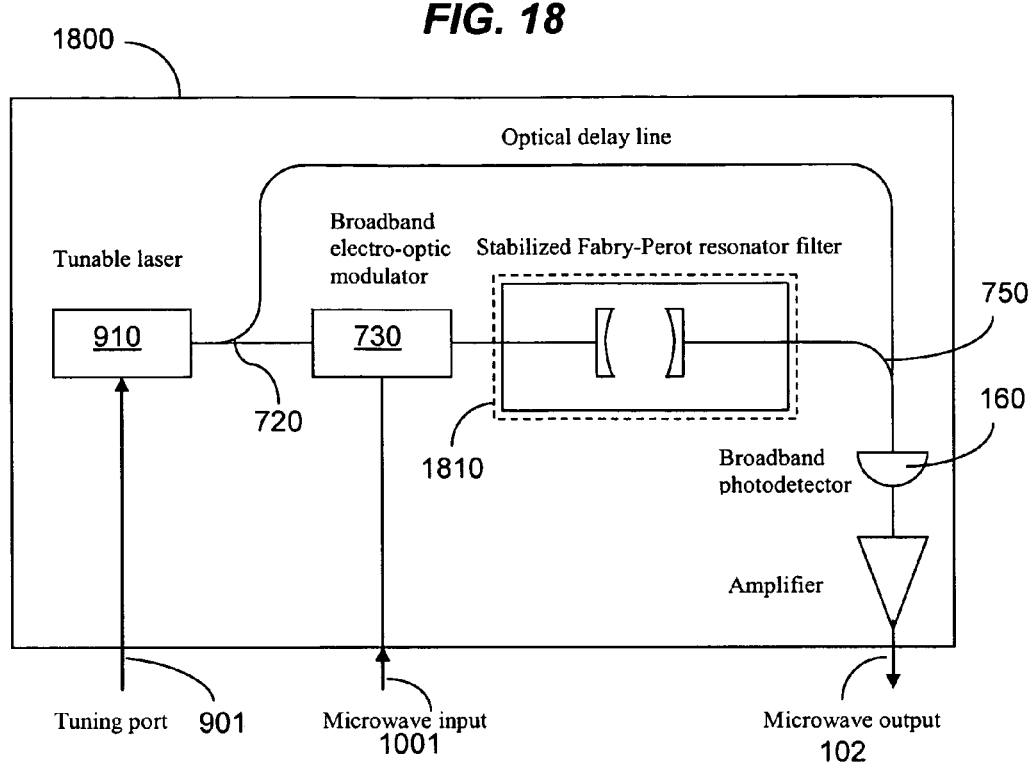
FIGS. 18 and 19 shows two exemplary implementations based on the filter design in FIG. 16.
Figure 19:
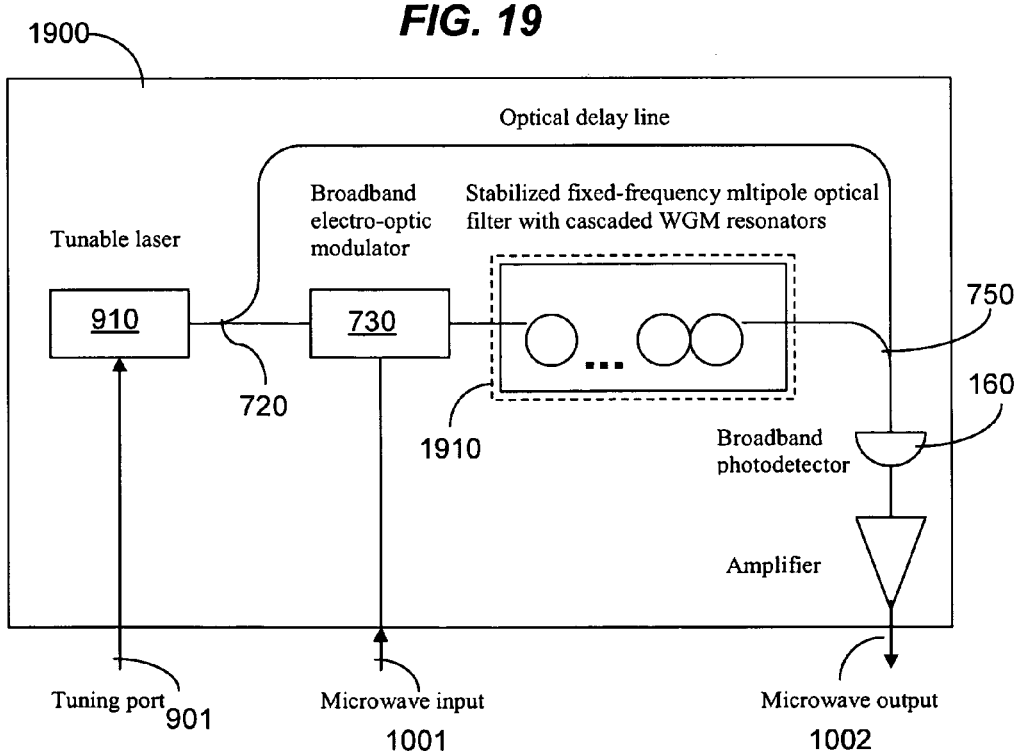

FIGS. 18 and 19 show two examples of tunable RF or microwave filters based on the design in FIG. 16. In the filter 1800 in FIG. 18, a Fabry-Perot resonator filter 1810 is used as the filter 920 in FIG. 16. The filter 1900 in FIG. 19 uses a multi-pole filter 1910 with cascaded WGM microresonators as the filter 920 in FIG. 16. The multi-pole filter may be formed by cascaded ring resonators, microsphere resonators, or toroidal resonators that support whispering-gallery modes. The filters described in FIGS. 11A through 15 may also be used as the filter 920.

This use of the tunable laser 910 for tuning the frequency of the filtered RF or microwave signal 1002 can simplify the construction of the optical filter 920 because a fixed filter can be used as the filter 920 without the frequency tuning mechanism. Tunable multi-pole optical filters can be complex because changes in the multi-pole variants are to be synchronized during the tuning in order to maintain the desired multi-pole filter function. One or more resonators used in the fixed filter 920 may still be tunable filters to allow for tuning of individual resonators by the electro-optic or other effects to set the desired offsets of resonance frequencies so that a desired initial spectral profile of the filter passband can be achieved. Alternatively, UV-sensitive materials may also be used to form the resonators for the filter 920 so that UV trimming can be used to modify the refractive indices of the resonators and thus control the resonance frequencies of the resonators by exposing the resonators to UV light. After the initial filter profile is set, the optical filter 920 may be stabilized. The RF filter tuning is then achieved by tuning the laser frequency.

Agile frequency tuning in lasers, such as diode lasers and diode-based lasers, is well developed and can be implemented by different methods. For example, the driving current in distributed feedback (DFB) semiconductor lasers can be changed to tune the laser frequencies. Typical range of frequency tuning in some DFB lasers in the communication band 1550 nm is about 60–80 GHz, with an optical laser linewidth of about 1 MHz. Such tunable lasers are suitable for use in tunable RF or microwave filters with a tunable transmission passband of about 20 MHz and more.

Only a few implementations are disclosed. However, it is understood that variations and enhancements may be made.

What is claimed is what is described and illustrated, including:

1. A method, comprising:
    providing an opto-electronic oscillator device having a closed opto-electronic loop which comprises an electronic section and an optical section and forms a positive feedback loop, wherein the closed opto-electronic loop includes an input port to receive an input signal at an input signal frequency and an output port to output an output signal at an output signal frequency;
    setting the closed opto-electronic loop at an initial state with a loop gain below an oscillation threshold when the input port does not receives the input signal;
    injecting the input signal into the input port to operate the closed opto-electronic loop above the oscillation threshold to produce and sustain an oscillation signal in the closed opto-electronic loop; and
    coupling a portion of the oscillation signal out of the closed opto-electronic loop to produce the output signal at the output port.

2. The method as in claim 1, wherein the output signal frequency is equal to the input signal frequency.

3. The method as in claim 1, wherein the closed opto-electronic loop has a nonlinear response to generate the output signal frequency that is different from the input signal frequency.

4. The method as in claim 3, further comprising using a bandpass filter to filter the oscillation signal in the closed opto-electronic loop to transmit at the output signal frequency and to suppress signals at other frequencies.

5. The method as in claim 4, wherein the bandpass filter has a center frequency that is a harmonic frequency of the input signal frequency.

6. The method as in claim 4, wherein the bandpass filter has a center frequency which is equal to the input signal frequency divided by a factor of N where N is an integer greater than 1.

7. The method as in claim 1, further comprising adjusting a phase delay of the closed opto-electronic loop to select the frequency of the oscillation signal to be at the output signal frequency.

8. The method as in claim 1, wherein the input port is an optical port and the input signal is carried in an modulated optical carrier which is received by the optical port.

9. The method as in claim 1, wherein the output port is an optical port which produces an output modulated optical carrier that carries the output signal.

10. A device, comprising:
    a closed opto-electronic loop comprising an electronic section to carry an electronic signal, an optical section comprising an optical modulator to modulate an optical carrier to produce a modulated optical signal carrying the electronic signal, and a photodetector interconnecting the electronic section and the optical section to convert the optical signal into the electronic signal, wherein the electronic section is coupled to feed the electronic signal to control the optical modulator;
    an input coupler coupled to the closed opto-electronic loop to receive and inject an input signal at an input signal frequency supported by the electronic portion; and
    an output coupler coupled to the closed opto-electronic loop to couple an output signal out of the closed opto-electronic loop at an output signal frequency supported by the electronic portion and different from the input signal frequency,
    wherein the closed opto-electronic loop forms a positive feedback loop and has a nonlinear response to produce at least one nonlinear signal component at the output signal frequency.

11. The device as in claim 10, wherein the electronic section of the closed opto-electronic loop comprises a bandpass filter to transmit at the output signal frequency and suppress signals at the input signal frequency and frequencies different from the output signal frequency.

12. The device as in claim 11, wherein the bandpass filter comprises:
    an input port coupled to the electronic section to receive an input microwave or RF signal from the electronic section;
    a laser to produce a continuous-wave laser beam;
    a first optical path to receive a first portion of the laser beam;
    a second optical path to receive a second portion of the laser beam, the second optical path comprising:
    an optical modulator to modulate the second portion in response to the input signal to produce a modulated optical beam that carries the input signal, and
    a tunable optical filter to filter the modulated optical beam to select at least one spectral component in the input signal while rejecting other spectral components and to output a filtered modulated optical beam that carries the at least one selected spectral component at the output signal frequency, the tunable optical filter comprising two optical resonators that are optically coupled to produce a filter function of at least a second order;
    a tuning control unit to tune at least one of the two optical resonators to change a frequency of the at least one selected spectral component;
    an optical detector to combine the first portion from the first optical path and the filtered modulated optical beam from the second optical path and to produce a filtered output signal comprising the selected spectral component; and
    an output port coupled to the electronic section to output the filtered output signal into the electronic section.

13. The device as in claim 10, wherein the electronic section of the closed opto-electronic loop comprises a phase shifter which changes a phase of the electronic signal applied to the optical modulator.

14. The device as in claim 10, wherein the input coupler is an electronic signal coupler.

15. The device as in claim 10, wherein the input coupler is an optical coupler which receives an input optical signal that is optically modulated to carry the input signal.

16. The device as in claim 10, wherein the output coupler is an electronic signal coupler.

17. The device as in claim 10, wherein the output coupler is an optical coupler which couples light out of the optical section of the closed opto-electronic loop that is optically modulated to carry the output signal.

18. The device as in claim 10, wherein the optical section of the closed opto-electronic loop comprises a laser resonator which produces the light in the optical section and the optical modulator resides inside the laser resonator.

19. A device, comprising:
   a closed opto-electronic loop comprising an electronic section to carry an electronic signal, an optical section comprising an optical modulator to modulate an optical carrier to produce a modulated optical signal carrying the electronic signal, and a photodetector interconnecting the electronic section and the optical section to convert the optical signal into the electronic signal, wherein the electronic section is coupled to feed the electronic signal to control the optical modulator;
   an input coupler coupled to the closed opto-electronic loop to receive and inject an input signal at an input signal frequency supported by the electronic portion; and
   an input coupler coupled to the closed opto-electronic loop to couple an output signal out of the closed opto-electronic loop at an output signal frequency supported by the electronic portion and different from the input signal frequency,
   wherein the closed opto-electronic loop forms a positive feedback loop and comprises a bandpass filter to transmit at the output signal frequency and suppress signals at the input signal frequency and frequencies different from the output signal frequency.

20. The device as in claim 19, wherein the bandpass filter comprises:
   an input port coupled to the electronic section to receive an input microwave or RF signal;
   a tunable laser to produce a continuous-wave laser beam and to tune a laser frequency of the laser beam;
   a first optical path to receive a first portion of the laser beam;
   a second optical path to receive a second portion of the laser beam, the second optical path comprising:
   an optical modulator to modulate the second portion in response to the input signal to produce a modulated optical beam that carries the input signal, and
   an optical filter to filter the modulated optical beam to select at least one spectral component in the input signal while rejecting other spectral components and to output a filtered modulated optical beam that carries the at least one selected spectral component;
   a tuning control unit to tune the laser frequency of the tunable laser to change a frequency of the at least one selected spectral component;
   an optical detector to combine the first portion from the first optical path and the filtered modulated optical beam from the second optical path and to produce a filtered output signal comprising the at least one selected spectral component; and
   an output port coupled to the electronic section to output the filtered output signal into the electronic section.

\* \* \* \* \*